United States Patent
Yeung et al.

(10) Patent No.: US 12,535,809 B2
(45) Date of Patent: Jan. 27, 2026

(54) MODULAR, GENERAL PURPOSE, AUTOMATED, ANOMALOUS DATA SYNTHESIZERS FOR ROTARY PLANTS

(71) Applicants: MASSACHUSETTS INSTITUTE OF TECHNOLOGY, Cambridge, MA (US); THE JAPAN STEEL WORKS, LTD., Tokyo (JP)

(72) Inventors: Yip Fun Yeung, Cambridge, MA (US); Ali Alshehri, Cambridge, MA (US); Lois Wampler, Cambridge, MA (US); Takayuki Hirano, Kashiwa (JP); Mikio Furokawa, Higashi-Hiroshima (JP); Kamal Youcef-Toumi, Cambridge, MA (US)

(73) Assignees: Massachusetts Institute of Technology, Cambridge, MA (US); The Japan Steel Works, Ltd., Tokyo (JP)

( * ) Notice: Subject to any disclaimer, the term of this patent is extended or adjusted under 35 U.S.C. 154(b) by 53 days.

(21) Appl. No.: 17/508,298

(22) Filed: Oct. 22, 2021

(65) Prior Publication Data

US 2022/0155771 A1 May 19, 2022

Related U.S. Application Data

(60) Provisional application No. 63/104,137, filed on Oct. 22, 2020.

(51) Int. Cl.
*G05B 23/02* (2006.01)
*G05B 13/02* (2006.01)
*G06F 18/214* (2023.01)

(52) U.S. Cl.
CPC ..... *G05B 23/0281* (2013.01); *G05B 13/0265* (2013.01); *G05B 23/0264* (2013.01);
(Continued)

(58) Field of Classification Search
None
See application file for complete search history.

(56) References Cited

U.S. PATENT DOCUMENTS 5,735,015 A * 4/1998 Yoshida ............. F16F 1/38
15/250.31
10,168,248 B1 * 1/2019 Morey ............. G01M 13/045
(Continued)

FOREIGN PATENT DOCUMENTS

CN 106443447 A * 2/2017

OTHER PUBLICATIONS

X. Shi et. al., "Development of fault diagnosis test bench for doubly-fed wind generator based on stator current analysis method," 2019 Chinese Control And Decision Conference (CCDC), 2019, pp. 3921-3926, doi: 10.1109/CCDC.2019.8833470. downloaded from https://ieeexplore.ieee.org/document/8833470 (Year: 2019).*
(Continued)

*Primary Examiner* — Michael J Dalbo
*Assistant Examiner* — Denise R Karavias
(74) *Attorney, Agent, or Firm* — Barnes & Thornburg LLP

(57) ABSTRACT

An anomalous scenario synthesizer apparatus includes a rotatable shaft configured to be rotationally driven about a rotation axis, a data acquisition system operably associated with the rotatable shaft and configured to measure attributes of the rotatable shaft, and a dynamic anomaly generator operably connected to the rotatable shaft. The dynamic anomaly generator is configured to generate at least one anomaly in the rotatable shaft while the rotatable shaft is rotating, and is configured to generate at least one dynamic label for each anomaly while the rotatable shaft is rotating. The dynamic label for each anomaly includes at least one descriptor corresponding to the anomaly that describes the
(Continued)

anomaly such that a machine learning method may utilize the descriptor for machine learning.

20 Claims, 19 Drawing Sheets

(52) U.S. Cl.
 CPC ..... *G05B 23/0267* (2013.01); *G05B 23/0283* (2013.01); *G06F 18/2155* (2023.01)

(56) References Cited

U.S. PATENT DOCUMENTS

| | | | | |
|---|---|---|---|---|
| 2015/0160101 | A1* | 6/2015 | Gao | G01M 13/028 |
| | | | | 702/6 |
| 2019/0130288 | A1* | 5/2019 | Boggio | B64D 45/00 |
| 2020/0269904 | A1* | 8/2020 | Oda | B62D 5/046 |

OTHER PUBLICATIONS

Nectoux et al., "PRONOSTIA : An experimental platform for bearings accelerated degradation tests" Hal Open Science, Jun. 2012, downloaded from https://hal.science/hal-00719503/document (Year: 2012).*

Immovilli et al., Experimental Investigation of Shaft Radial Load Effect on Bearing Fault Signatures Detection, IEEE, Industry Applications, vol. 53, No. 3, pp. 2721-2729, May-Jun. 2017, doi: 10.1109/TIA.2016.2633236, downloaded from https://ieeexplore.ieee.org/document/7762079?source=IQplus (Year: 2017).*

Chaolong et al,"Transformer fault diagnosis method using IoT based monitoring system and ensemble machine learning" Mar. 6, 2020 Future Generation Computer Systems, vol. 108, download from Transformer fault diagnosis method using IoT based monitoring system and ensemble machine learning—ScienceDirect (Year: 2020).*

A. H. Bonnett, "Root cause AC motor failure analysis with a focus on shaft failures," in IEEE Transactions on Industry Applications, vol. 36, No. 5, pp. 1435-1448, Sep.-Oct. 2000, doi: 10.1109/28.871294. (Year: 2000).*

Chen, et al., Metamaterials application in sensing, Sensors, 12(3):2742-2765, 2012.

Dau, et al., "Ford dataset—the UCR time series classification archive." IEEE/CAA Journal of Automatica Sinica, vol. 6, pp. 1293-1305, Nov. 2019.

Dau, et al., "UMD dataset—the UCR time series classification archive." IEEE/CAA Journal of Automatica Sinica, vol. 6, pp. 1293-1305, Nov. 2019.

Dua, et al., "Space Shuttle dataset—the UCI machine learning repository." 2017.

Goldberger, et al., "Binary HeartBeat dataset and ECG dataset—PhysioBank, PhysioToolkit, and PhysioNet," Circulation, vol. 101, Jun. 2000.

Hochreiter, et al., "Long Short-Term Memory," Neural Computation, vol. 9, pp. 1735-1780, Nov. 1997.

Huang, et al., "Time series k-means: a new k-mean type smooth subspace clustering for time series data," Information Sciences, vol. 367-368, pp. 1-13, Nov. 2016.

Keogh, et al., Logical-shapelets: an expressive primitive for time serie classification,: in Proceedings of the 17th ACM SIGKDD international conference on Knowledge discovery and data mining—KDD' 11, (New York, New York, USA), p. 1154, ACM Press, 2011.

Pang, et al., "Deep learning for anomaly detection: a review," ACM Computing Surveys, vol. 54, No. 2, pp. 1-36, 2021.

Pendry, J.B., "Negative refraction makes a perfect lens." Physical Review Letters, 85(18):3966-3969, 2000.

Yanping, Chen Eamonn Keogh, Bing u, Nurjahan Begum, Anthony Bagnall, Adbullah Mueen and Gustavo Batista (2005). The UCR Time Series Classification Archive. URL www.cs.ucr.edu/~eamonn/time_series_data/.

Yeh, et al., Matrix Profile I: All Pairs Similarity Joins for Time Series: A Unifying View That Includes Motifs, Discords and Shapelets,: in 2016 IEEE 16th International Conference on Data Mining (ICDM), pp. 1317-1322, IEEE, Dec. 2016.

Yeung, et al., "GPAD: A Synthetic Time-Series General-Purpose Anomaly Dataset in Physical Domain."

Yeung, et al., "the MIT MRL general purpose anomalous scenario data," Jan. 2021. https:mrl-anomaly.github.io/.

Behzad et al., "Effect of centrifugal force on natural frequency of lateral vibration of rotating shafts," Journal of Sound and Vibration 274, 2004.

Chuah et al., "ECG Anomaly Detection via Time Series Analysis," Department of Computer Science & Engineering, Lehigh University.

Gangsar et al., "Comparative investigation of vibration and current monitoring for prediction of mechanical and electrical faults in induction motor based on multiclass-support vector machine algorithms," Mechanical Systems and Signal Processing, 94, 2017.

Ge et al., "Deformable Markov Model Templates for Time-Series Pattern Matching," Information and Computer Science, University of California, Irvine.

Gest et al., "Design of Versatile and Low-Cost Shaft Sensor for Health Monitoring," International Conference on Robotics and Automation, 2019.

Kacprzynski et al."Predicting Remaining Life by Fusing the Physics of Failure Modeling with Diagnostics," JMO, Mar. 2004.

Li et al., "Rotational Machine Healh Monitoring and Fault Detection Using EMD-Based Acoustic Emission Feature Quantification," IEEE Transactions on Instrumentation and Measurement, vol. 61 No. 4, Apr. 2012.

Lu et al., "Fault diagnosis of rotary machinery components using a stacked denoising autoencoder-based health state identification," Signal Processing, Jul. 2016.

Malhotra et al., "LSTM-based Encoder-Decoder for Multi-sensor Anomaly Detection," arXiv:1607.00148v2, Jul. 2016.

Mogal et al., "Fault diagnosis of bent shaft in rotor bearing system," Journal of Mechanical Science and Technology 31, 2017.

Nectoux et al., "PRONOSTIA: An experimental platform for bearings accelerated degradation tests," HAL archives-ouvertes, Jul. 2012.

Swanson et al., "A practical Review of Rotating Machinery Critical Speeds and Modes," Journal of Sound and Vibration, May 2005.

UCR Time Series Claassification Archive, [https://www.cs.ucr.edu/~eamonn/time_series_data_2018/].

Yeung et al., "A General-Purpose Anomalous Scenario Synthesizer for Rotary Equipment," IEEE International Conference on Robotics and Automation, 2021.

Yeung et al., "An In-Pipe Manipulator for Contamination-Less Rehabilitation of Water Distribution Pipes," IEEE.

Zhang et al., "Transformer fault diagnosis method using IoT based monitoring system and ensemble machine learning," Future Generation Computer Systems 108, 2020.

* cited by examiner

MODULAR, GENERAL PURPOSE, AUTOMATED, ANOMALOUS DATA SYNTHESIZERS FOR ROTARY PLANTS

PRIORITY CLAIM

This application claims priority to and the benefit of U.S. Provisional Patent Application No. 63/104,137, entitled "A Modular, General Purpose, Automated, Anomalous Data Synthesizer for Rotary Plants," filed Oct. 22, 2020, the content of which is incorporated by reference herein in its entirety.

FIELD

The present disclosure is directed to data synthesizers for rotary plants, and more particularly relates to dynamic anomaly generators capable of processing and labeling anomalies in a more efficient manner.

BACKGROUND

Anomalies represent outliers in a set of data, which may be indicative of a potential problem with a particular system. In the context of a machine, such as a rotary plant, anomaly detection can provide important feedback to an operator to identify potential inefficiencies or points of failure. In fact, anomaly detection and health monitoring (AD&HM) are core concerns for most engineering applications. Health monitoring is a critical aspect for both physical and virtual machines, spanning from manufacturing plant monitoring to cyber-safety detection. Since the last century, diagnosis of past anomalous events and prognosis for future anomalies have been trending topics. Especially with the rapid advancement of computing power in recent years, data-driven anomaly analysis is gaining popularity, in place of traditional methods that utilize model-based analysis of real plants. Anomalous scenarios on a rotary plant source both internally and externally. Internally, time-invariant anomalous (time-invariant, or TI, anomalies may also be referred to as static anomalies) components in the plant, such as defective bearings and imbalanced inertia, can lead to amplified vibration or excessive torque application. Anomalies also originate from the interaction with the external environment. For instance, plastic extrusion can lead to a large torsional displacement on the shaft of an injection-molding machine, and normal loads exerted on the drive-shaft of an automobile can lead to significant bending and vibration. These anomalies take place in two directions, i.e., axially and radially (also referred to as coaxially and orthogonally, respectively). Most operating scenarios, either normal or anomalous, can be synthesized by commanding the external torque on the shaft in the axial direction, or coaxial direction, or the lateral load in the radial direction, or orthogonal direction.

Data-driven anomalous analysis regularly involves training with existing data sets and generalize the architecture to relevant domains. The most efficient channel for data-based researchers to acquire data sets is via public sources. Nonetheless, for research that is centered on specific applications, it is often an arduous job to find public data sets that match the targeted applications and are effortlessly transferable. On the other hand, for general purpose database research, it is common to find that popular data sets, like the anomalous ECG and space-shuttle data, has been explored in multiple studies.

In particular, real-world anomalous data sets on physical machines are rare, due, at least in part, to the expense from constantly monitoring anomalous events that sparsely take place. Further, real-world anomalous data sets on physical machines are often unlabeled, owing, at least in part, to the difficulty in quantifying the anomalous actions and recording their time lines.

Unsupervised learning methods are similar to model-free applications, while supervised learning methods incline to the anomaly detection end-alerts broadcast whenever incoming signals map to a specific type of learned anomalies. The performance of data-driven AD&HM methods is often limited due to several qualities in existing training datasets. As determined in conjunction with arriving at the concepts disclosed herein, at least the following attributes can be improved to create an enhanced anomaly dataset: frequent anomaly (FA), which can improve data efficiency; automated anomaly (AA), which can scale up dataset volume; reproducible anomaly (RA), which can improve model fidelity; supervised anomaly label (Sp), which can alter training process; model-agnostic process (MA), which can better represent reality; diverse anomaly modes (DM), which can ameliorate covariate shift; and high-dimensional observer (Ob), which can enrich information gain.

Given that many anomaly datasets are artificially simulated, model agnosticism describes the extent to which a faulty synthetic event is independent of ideal assumptions, for example, the vehicle collision models used in game engines. This characteristic arises from the concern that synthetic anomalies in the physical and cyber domains either overly-simplify the argument to retain fruitful results or are exceedingly complex to construct. On the other hand, natural anomalies are often detrimental to reproduce, impractical to capture accurately, or constrained to disclose.

A popular alternative is to synthesize anomalous data on a benchtop test plant. As illustrated in FIG. 1, the general data synthesis process involves the following steps: input variables $U \in \mathbb{R}^{m \times l}$ are fed into a physical plant, in normal or anomalous condition, and the states $X \in \mathbb{R}^{m \times l}$ are updated, which are measured via a sensor system and produces $Y \in \mathbb{R}$ Px/signals.

Existing anomaly synthesizers are disadvantageous in at least a few aspects. For example, being limited to introducing only static anomalies is a significant short-coming. Static anomalies normally include replacing quality parts with defected ones or operating under bad service conditions. The anomalous plant, $G_a$, varies between runs, but is time-invariant or negligibly variant during each run. Impulsive anomaly synthesizers are occasionally developed, but a synthesizer for generic dynamic anomalies (also referred to as time-varying anomalies) is lacking, and inevitably, so is labelling the synthesized anomalies in time series. By way of further example, uni-modality of anomalous events is another major inconvenience. Most existing synthesizer test beds are developed for a single type of anomaly. Even on the same subject, researchers have to develop new sets of devices to introduce anomalies of other types. From the data acquisition perspective, measurements in available anomalous data sets are often univariate or multi-variate with low dimensions. Access to multi-variate measurements on the same anomalous event can be tangibly useful for data-driven studies.

In summary, a general purpose benchtop platform compatible to introduce and label multi-modes of anomalies, acquire multi-variate streams of data, and is conveniently upgradeable and scalable by non-experts can bring practical benefit to the community.

SUMMARY

This Summary introduces a selection of concepts in simplified form that are described further below in the Detailed Description. This Summary neither identifies key or essential features, nor limits the scope, of the claimed subject matter.

A General Purpose Anomalous Scenario Synthesizer (GPASS) described herein centers around generating anomalous scenarios applied to a physical system with a rotating shaft, and can be used in general purpose anomaly synthesizers. One embodiment of an apparatus for analyzing anomalies includes a physical system comprising a rotating shaft, a data acquisition system connected to the physical system to probe attributes of the physical system in multiple domains, and a dynamic anomaly generator connected to the physical system to synthesize a dynamic anomaly in the physical system. In an example implementation, at least three sub-systems make up a GPASS test bed, including a benchtop rotation shaft plant, a customized wireless data acquisition system, and a dynamic anomaly generator.

Compared to existing data synthesizing and acquisition benchtops for anomalous analysis, the GPASS improves in several aspects. In one improved aspect, the GPASS covers a wide range of anomalous modes. Static anomalies such as defected components and dynamic anomalies such as normal force, collision, and damping can be carried out with the same set up. In another improved aspect, the data acquisition system of the GPASS outputs multi-variate data sets. In still another improved aspect, the GPASS can optionally combine multiple anomalous modes, creating controlled and reproduceable synthesizing conditions that isolate effects of certain anomalies. In another improved aspect, the GPASS quantifies and records the actual anomalous events, which can potentially be used as labels for supervised learning. In yet another improved aspect, the GPASS can include an on-board automatic tool changer (ATC), which can allow long-period, autonomous, and multimodal anomaly generation without intermittent hardware or software set-up.

One exemplary embodiment of an anomalous scenario synthesizer apparatus includes a rotatable shaft configured to be rotationally driven about a rotation axis, a data acquisition system operably associated with the rotatable shaft and configured to measure attributes of the rotatable shaft, and a dynamic anomaly generator operably connected to the rotatable shaft. The dynamic anomaly generator is configured to generate at least one anomaly in the rotatable shaft while the rotatable shaft is rotating, and further, is configured to generate at least one dynamic label for each anomaly of the at least one anomaly while the rotatable shaft is rotating. The at least one dynamic label for each anomaly includes at least one descriptor corresponding to the anomaly that describes the anomaly such that a machine learning method may utilize the at least one descriptor for machine learning.

In some embodiments, the dynamic anomaly generator comprises a coaxial anomaly assembly operably coupled to the rotatable shaft and configured to generate at least one anomaly that is a coaxial anomaly that takes effect around the rotation axis of the rotatable shaft while the rotatable shaft is rotating. The rotational shaft can be rotational driven by a first motor operably connected to a first terminal end of the rotational shaft, and the coaxial anomaly assembly can include a second motor operably connected to a second terminal end of the rotational shaft opposite the first terminal end. The second motor can be configured to generate the at least one anomaly that is a coaxial anomaly. The dynamic anomaly generator can include an orthogonal anomaly assembly operably coupled to the rotatable shaft and configured to generate at least one anomaly that is an orthogonal anomaly exerted in a first direction substantially perpendicular to the rotation axis of the rotatable shaft.

By way of another non-limiting example, the orthogonal anomaly assembly can be further configured to generate a constant load on the rotation shaft in the first direction substantially perpendicular the rotation axis of the rotatable shaft to cause deflection and/or torsion of the rotatable shaft. The data acquisition system can be configured to measure attributes of the rotatable shaft caused by the deflection and/or torsion. Alternatively, or additionally, the orthogonal anomaly assembly may be configured to generate a vibration load on the rotatable shaft to cause vibration of the rotate shaft. In some such instances, the data acquisition system can be configured to measure attributes of the rotatable shaft caused by the vibration load. The dynamic anomaly generator can be further configured to generate at least one time step associated with each anomaly of the at least one anomaly, and the at least one dynamic label for each anomaly can be generated for each time step of the at least one time step. The data acquisition system can include at least one sensor configured to measure attributes of the rotatable shaft in response to the dynamic anomaly generator generating the at least one anomaly.

By way of still another non-limiting example, the attributes of the rotatable shaft measured by the data acquisition system can include at least one of coaxial damping coefficient, end-effector force, or active vibration frequency. In some instances, to provide accurate real-time labeling of a ground truth health condition, for each time step, the dynamic anomaly generator can be configured to format the dynamic label as:

$Ya(n)[0]$: Macro Health Mode $K \in S: = \{H,A\}$;

$Ya(n)[1]$: Sub-level Mode $k \in s: = \{H,D,\{Ne\},\{Ve\}\}$; and $Ya(n)[2]$: Numeric Attribute $yk \in Yk; k \in s$.

In some embodiments, the apparatus can also include a housing in which the rotatable shaft can be at least partially disposed. The orthogonal anomaly assembly can include, by way of non-limiting examples, a linear stage and/or an automatic tool changer rotatably coupled to the housing, the automatic tool changer including at least one deployment assembly. The linear stage can include a main actuator fixedly coupled relative to the housing. In some embodiments, each deployment assembly of the at least one deployment assembly can include a slider rail that extends substantially perpendicularly relative to the rotation axis of the rotatable shaft and an end-effector arm configured to slidably move along the slider rail. The main actuator can be configured to slidably move the end-effector arm along the slider rail such that the end-effector arm moves toward the rotatable shaft to generate the at least one anomaly that is an orthogonal anomaly.

Each end-effector arm can include a carriage configured to slidably move along the slider rail, as well as a rack arranged on a lateral side of the end-effector arm. The rack can be configured to interact with the main actuator to slidably move the end-effector arm along the slider rail toward the rotatable shaft. The end-effector arm can include at least one sensor of the data acquisition system and an end-effector tool head. The orthogonal anomaly assembly can include a remote end-effector coupler coupled to the rotatable shaft. The orthogonal assembly can be configured to interact with the end-effector tool head to generate the at least one anomaly that is an orthogonal anomaly. The automatic tool changer can be configured to rotate about an axis parallel with the first direction. The dynamic anomaly generator can be configured to rotate the automatic tool changer to align a deployment assembly of the at least one deployment assembly with the main actuator of the linear stage such that the deployment unit is in position to be slidably moved via the main actuator.

An exemplary embodiment of a dynamic anomaly generator includes a coaxial anomaly assembly, an orthogonal anomaly assembly, and a controller. The coaxial anomaly assembly is configured to be operably coupled to a rotatable shaft and is configured to generate at least one coaxial anomaly that takes effect around a rotation axis of the rotatable shaft to which the coaxial anomaly assembly is operably coupled while the rotatable shaft is rotating. The orthogonal anomaly assembly is configured to be operably coupled to the rotatable shaft to which the coaxial anomaly assembly is operably coupled and is configured to generate at least one orthogonal anomaly exerted in a first direction substantially perpendicular to the rotation axis of the rotatable shaft. The controller is configured to generate at least one dynamic label for each coaxial anomaly of the at least one coaxial anomaly and at least one dynamic label for each orthogonal anomaly of the at least one orthogonal anomaly while the rotatable shaft is rotating. The at least one dynamic label for each coaxial anomaly and the at least one dynamic label for each orthogonal anomaly includes at least one descriptor that corresponds to the anomaly that describes the anomaly such that a machine learning method may utilize the at least one descriptor for machine learning.

In some embodiments, the rotatable shaft can be configured to be rotationally driven about the rotation axis. A data acquisition system can be operably associated with the rotatable shaft and can be configured to measure attributes of the rotatable shaft in response to the dynamic anomaly generator generating the at least one coaxial anomaly and/or the at least one orthogonal anomaly. The controller can be further configured to generate at least one time step associated with each anomaly of the at least one coaxial anomaly and/or the at least one orthogonal anomaly. The at least one dynamic label for each anomaly can be generated for each time step of the at least one time step. The generator can further include at least one sensor configured to measure attributes of the rotatable shaft to which the coaxial anomaly assembly is operably coupled in response to the coaxial anomaly assembly and the orthogonal anomaly assembly generating the at least one coaxial anomaly and the at least one orthogonal anomaly.

By way of another non-limiting example, the rotational shaft to which the coaxial anomaly assembly can be operably coupled can be rotational driven by a first motor operably connected to a first terminal end of the rotational shaft. The coaxial anomaly assembly can include a second motor operably connected to a second terminal end of the rotational shaft opposite the first terminal end. The second motor can be configured to generate the at least one coaxial anomaly. The attributes of the rotatable shaft measured by the data acquisition system can include at least one of coaxial damping coefficient, end-effector force, or active vibration frequency. The orthogonal anomaly assembly can be further configured to generate a constant load on the rotation shaft in the first direction substantially perpendicular to the rotation axis of the rotatable shaft to cause deflection and/or torsion of the rotatable shaft such that attributes of the rotatable shaft caused by the deflection and/or torsion can be measured. The orthogonal anomaly assembly can be further configured to generate a vibration load on the rotatable shaft to cause vibration of the rotate shaft such that attributes of the rotatable shaft caused by the vibration load can be measured.

An exemplary embodiment of a method of measuring anomalous scenarios includes rotating a rotatable shaft about a rotation axis and generating at least one of: (i) at least one coaxial anomaly that takes effect around the rotation axis of the rotatable shaft while the rotatable shaft is rotating via a dynamic anomaly generator operably connected to the rotatable shaft; or (ii) at least one orthogonal anomaly that is exerted in a direction substantially perpendicular to the rotation axis of the rotatable shaft while the rotatable shaft is rotating via the dynamic anomaly generator. The method further includes generating at least one dynamic label for each anomaly of the at least one coaxial anomaly and the at least one orthogonal anomaly while the rotatable shaft is rotating. The at least one dynamic label for each anomaly includes at least one descriptor corresponding to the anomaly that describes the anomaly such that a machine learning method may utilize the at least one descriptor for machine learning.

In some embodiments, the method further includes generating both of: (i) the at least one coaxial anomaly that takes effect around the rotation axis of the rotatable shaft while the rotatable shaft is rotating via a dynamic anomaly generator operably connected to the rotatable shaft; and (ii) the at least one orthogonal anomaly that is exerted in a direction substantially perpendicular to the rotation axis of the rotatable shaft while the rotatable shaft is rotating via the dynamic anomaly generator. The method can further include measuring at least one attribute of the rotatable shaft based on the at least one coaxial anomaly and/or the at least one orthogonal anomaly generated. The generating of the at least one orthogonal anomaly can further include generating a constant load on the rotatable shaft in the direction substantially perpendicular to the rotation axis of the rotatable shaft to cause deflection and/or torsion of the rotatable shaft. Alternatively, or additionally, the generating of the at least one orthogonal anomaly can further include generating a vibration load on the rotatable shaft to cause vibration of the rotatable shaft. The method can further include measuring at least one attribute of the rotatable shaft based on deflection of the rotatable shaft and/or torsion of the rotatable shaft and/or vibration of the rotatable shaft.

BRIEF DESCRIPTION OF THE DRAWINGS

The following Detailed Description references the accompanying drawings which form a part this application, and which show, by way of illustration, specific example implementations, in which.

Figure 1:
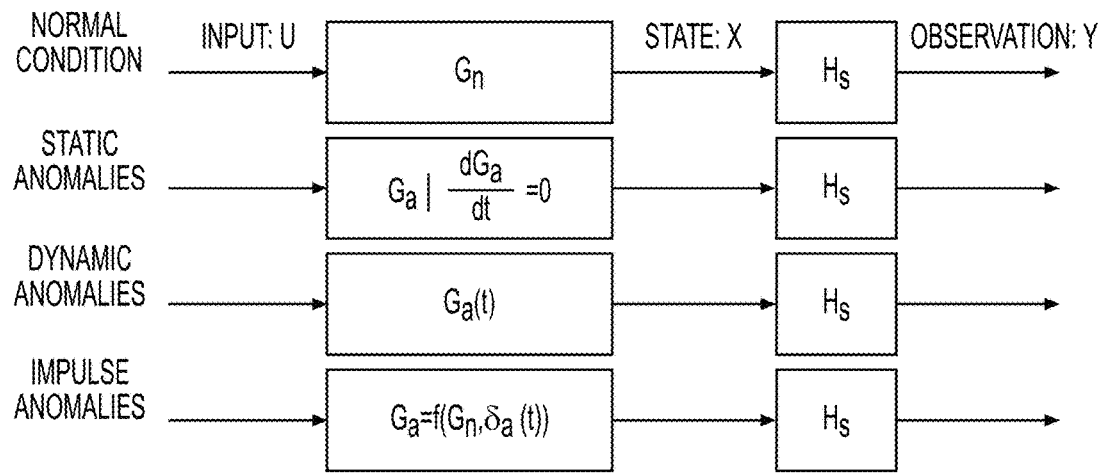
FIG. 1 is a schematic illustration that includes categories of anomalous scenarios on a simplified benchtop test plant.

Other implementations may be made without departing from the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, to the extent the present disclosure, including but not limited to the claims, describes something as occurring for "each" of something, the term "each" is not intended to be read as "each and every" unless explicitly indicated otherwise.

Accordingly, and by way of example, where an indication is that "at least one time step is associated with each anomaly of the at least one anomaly," this does not require that all anomalies have time steps, but just that at least one anomaly as recited includes a time step. If the "at least one anomaly" ends up being two anomalies (or three, four, etc.), then each of those two (or three, four, etc.) anomalies would have at least one time step, but there may be one or more other anomalies that fall outside of the purview of the "at least one anomaly" and thus do not have to have a time step (though they could).

The present disclosure provides some illustrations and descriptions that include prototypes, bench models, and/or schematic illustrations of set-ups. A person skilled in the art will recognize how to rely upon the present disclosure to integrate the techniques, systems, devices, and methods provided for herein into a product and/or a system provided to customers, such customers including but not limited to individuals in the public or a company that will utilize the same within manufacturing facilities or the like. To the extent features are described as being disposed on top of, below, next to, etc. such descriptions are typically provided for convenience of description, and a person skilled in the art will recognize that, unless stated or understood otherwise, other locations and positions are possible without departing from the spirit of the present disclosure.

According to the present disclosure, a General Purpose Anomalous Scenario Synthesizer (GPASS) can include a rotation shaft plant, a data acquisition system, and an anomaly generation system. The GPASS system, in particular the anomaly generation system, can be capable of generating anomalous scenarios applied to a rotating shaft of the rotation shaft plant while the shaft continuously rotates, and can further analyze the generated anomalies and resulting attributes of the shaft. Generated anomalies include both internal and external anomalies. Internal anomalies may include, for instance, static anomalous (as mentioned above, static anomalies may also be referred to as time-invariant, or TI, anomalies) components in the plant, such as defective bearings and imbalanced inertia, which can lead to amplified vibration or excessive torque application, shorted circuit, cracked shaft, and/or other similar and/or known anomalies. External anomalies may include, for instance, plastic extrusion leading to a large torsional displacement on the shaft of an injection-molding machine, and normal loads exerted on the drive-shaft of an automobile leading to significant bending and vibration, as well as an anomalous component resulting from external torque and/or external force, among other similar and/or known anomalies. External torque can lead to torsional displacement on the shaft or lead to bending of the shaft, which is similar to the effect of external force. External forces can also lead to elongation and/or compression of the shaft. Both external torque and forces on the shaft can lead to plastic or permanent deformation. These anomalies take place in two directions, i.e., coaxially and orthogonally (as mentioned above, these terms can also be referred to as axially and radially, respectively). The data acquisition system can be operably connected to the rotation shaft to, for example, probe attributes of the system in multiple domains (e.g., tension, bending, shear, and torsion caused by deflection of the rotating shaft). The anomaly generation system can include a dynamic anomaly generator connected to the rotation shaft plant. The dynamic anomaly generator can be configured to synthesize a dynamic anomaly (as mentioned above, the term dynamic anomaly can also be referred to as a time-varying anomaly) in the rotation shaft.

More specifically, internal anomalies may also include shorted circuit, cracked shaft, and the other similar anomalies. External anomalies may also include, in general, an anomalous component resulting from external torque and external force. External torque can lead to torsional displacement on the shaft or lead to bending of the shaft, which is similar to the effect of external force. External forces can also lead to elongation and/or compression of the shaft. Both external torque and forces on the shaft can lead to plastic or permanent deformation.

The dynamic anomaly generator can include one or both of a coaxial anomaly generator and an orthogonal anomaly generator. The coaxial anomaly generator can be operably coupled to the rotatable shaft, and further, can be configured to generate an anomaly that takes effect around the rotation axis of the rotatable shaft while the shaft is rotating. At differing times or simultaneously, the orthogonal anomaly generator, which can be operably coupled to the rotatable shaft, can be configured to generate an anomaly exerted in a direction substantially perpendicular to the rotation axis of the rotatable shaft while the shaft is rotating.

As a result of the capability of the GPASS system to produce multiple dynamic anomalies while the shaft is rotating, the GPASS system can cover a wide range of anomalous modes without necessarily needing to stop the rotation of the shaft and replace components to create the anomalies. Moreover, static anomalies, such as defected components, and dynamic anomalies, such as normal force, collision, and damping, can be carried out with the same set-up. Additionally, the GPASS system can output multivariate data sets. Still further, the GPASS system can optionally combine multiple anomalous modes, creating controlled and/or reproduceable synthesizing conditions that can isolate effects of certain anomalies. Even further, the GPASS system can quantify and record the actual anomalous events, which can potentially be used as labels for supervised learning. Additionally, the GPASS system allows for long-period, autonomous, and multimodal anomaly generation without intermittent hardware or software set-up.

Figure 2:
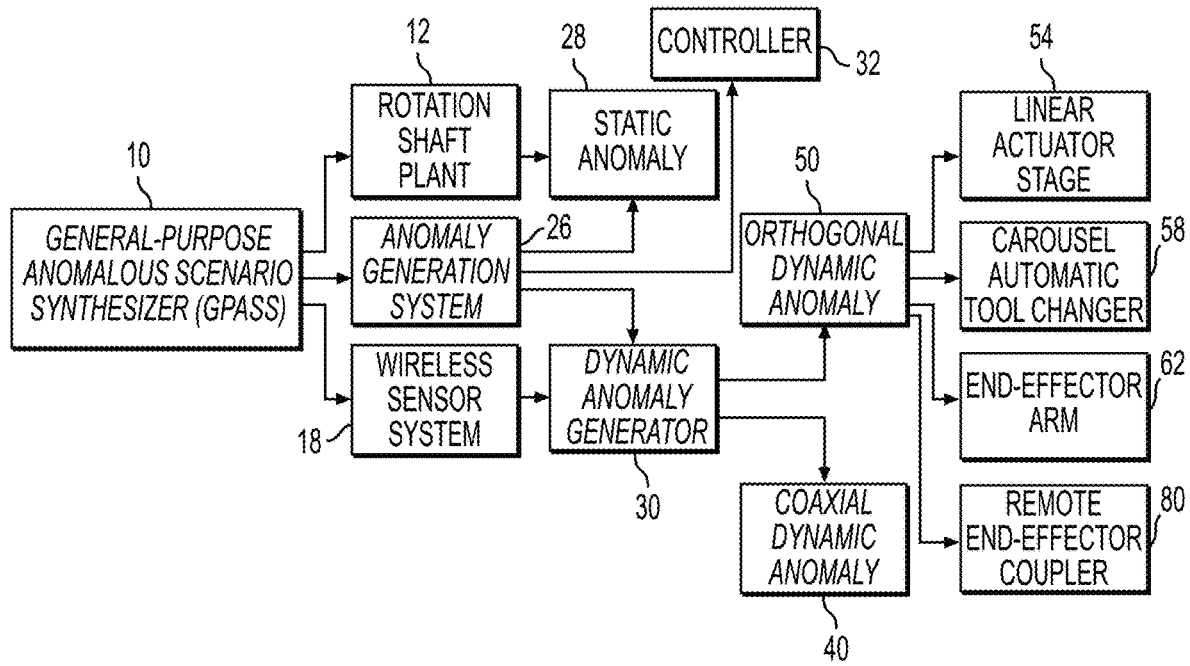
FIG. 2 is a schematic block diagram of a system-level overview of a GPASS system according to the present disclosure.
Figure 3:
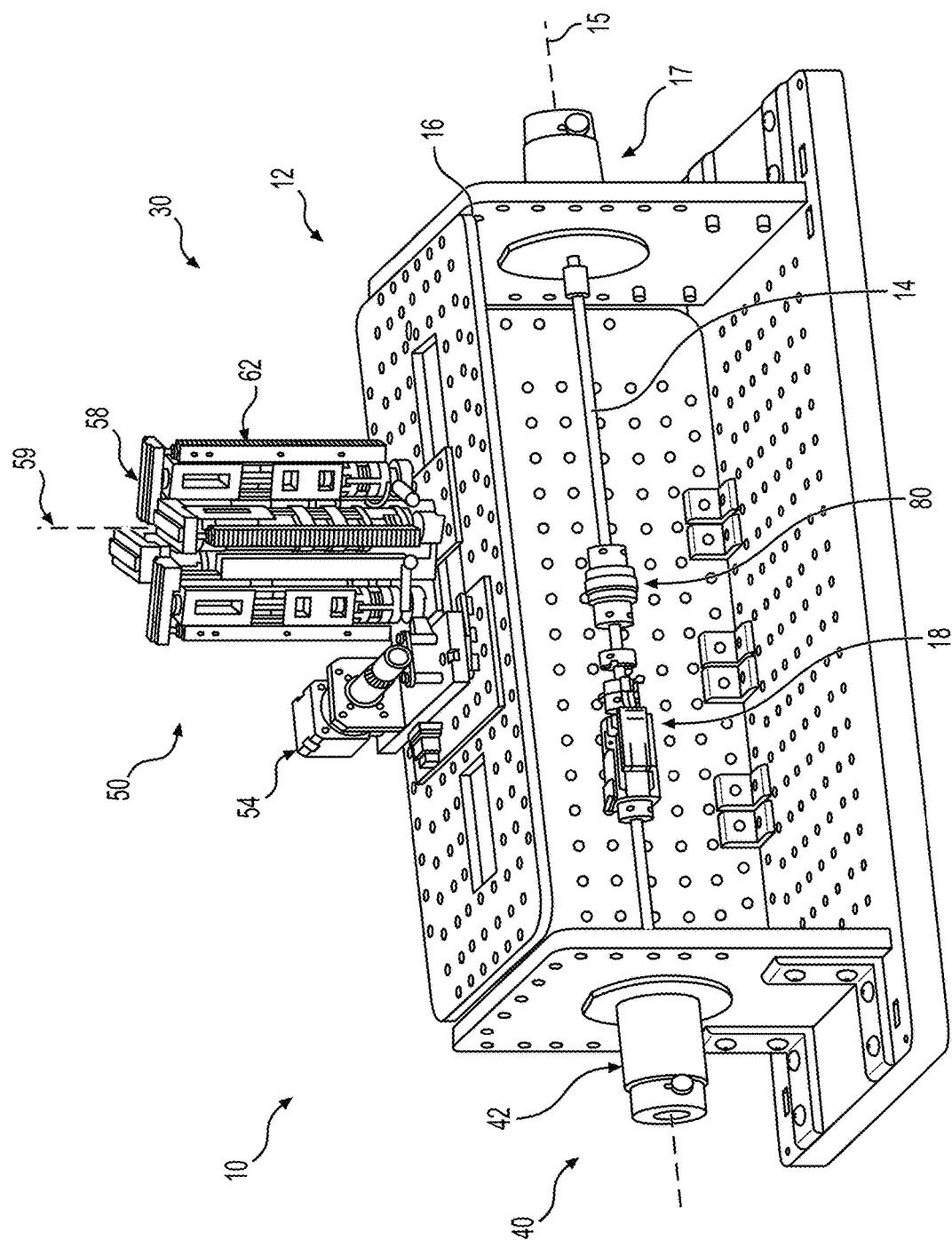
FIG. 3 is a perspective view of one embodiment of a GPASS system according to the present disclosure, illustrating a mechanical layout of sub-systems thereof.

As an overview, the present disclosure provides for various sub-systems of an example GPASS test bed, apparatus, or system 10, such as the schematic illustration provided for in FIG. 2 and the set-up illustrated in FIG. 3. An example implementation of a dynamic anomaly generator 30, which is a sub-system of the GPASS test bed 10, is then described, such as the dynamic anomaly generator also illustrated in FIGS. 2 and 3, as well as FIG. 4. An example implementation procedure of the GPASS system 10 is also provided, as are demonstrations to carry out various modes of anomalies, among other features described herein.

Prior to describing the details of the GPASS system, and related components, aspects, etc., the following table provides nomenclature that may be used and/or otherwise useful to better understand the descriptions provided herein:

| NOMENCLATURE | |
|---|---|
| $\epsilon_s$ | Strain on the surface of the shaft. |
| $\epsilon_{max,sg}$ | Maximum eligible strain for the strain gauge sensor. |
| U, X, Y | Input, state and output variables of a physical plant. |
| $G_n$, $G_a$ | Normal and anomalous physical plants. |
| $H_s$ | Representation of a sensor network. |
| $\omega_a$ | Active vibration frequency introduced by the OAG. |
| $\omega_o$ | First natural frequency of the OAG. |
| $\omega_r$ | Angular velocity of the rotating shaft. |
| $\omega_s$ | First natural frequency of the shaft. |
| $\omega_{wss}$ | Data acquisition frequency of the wireless sensor. |

| NOMENCLATURE | |
|---|---|
| $\rho$ | Radius of curvature of the deformed shaft. |
| P | Geometric parameters of the contactless port. |
| ,ct\|, cs | Subscript denoting contact/contactless interaction. |
| $B_{cs}$ | Magnetic flux density of the electromagnetic tool |
| $B_{cm}$ | Magnetic flux density when the electromagnet is on. |
| E, $I_{zz}$ | Modulus and area moment of inertia of the shaft. |
| $F_a$ | Rated force output from the actuator. |
| $F_n$ | Normal force exerted on the shaft. |
| $F_{n,w}$ | Vibration component of the normal force. |
| $F_{n,dc}$ | DC component of the normal force. |
| $F_{ref}$ | Reference force input. |
| $k_e$ | Mechanical stiffness of the end-effector arm. |
| $k_s$ | Effective stiffness of the shaft considering bending. |
| $k_t$ | Stiffness between tool head and receptor. |
| $k_{sus}$ | Stiffness of the mini suspension. |
| $K_{t,d}$ | Motor constant of the damping motor. |
| $m_s$, $l_s$, $r_s$ | Mass, length and radius of the shaft. |
| $M_z$ | Moment load on the shaft. |
| n, m, p | Dimensions of U, X, Y. |
| R | Discretely-varying resistance from the resistor array. |
| s = jw | Frequency parameter. |
| $T_d$ | Torque exerted on the shaft by the damping motor. |
| $x_a$ | Positional input from the main actuator. |
| $x_d$ | Deflection of the shaft from the original state. |
| $x_c$ | Displacement of the end-effector arm. |
| $x_n$ | Distance along the shaft axis from the coupling. |

GPASS System

Referring now to FIG. 2, a GPASS system according to the present disclosure is shown in a system level perspective in which a block diagram provides for one non-limiting embodiment of how the present disclosures can be implemented. In the illustrative embodiment, the GPASS system has three (3) sub-systems: (1) a rotation shaft plant 12; (2) a data acquisition system 18; and (3) an anomaly generation system 26. Additional aspects of the system illustrated in FIG. 2 will be described in greater detail below, but non-limiting embodiments of the three sub-systems will first be discussed. As shown, the block diagram of FIG. 2 is presented in a manner in which the line-arrows between blocks typically represent sub-components of a particular system rather than two particular blocks being in communication with each other. For example, as shown, three sub-systems of the GPASS system 10 include the rotation shaft plant 12, the data acquisition system 18, and the anomaly generation system 26. These sub-systems can be in communication with each other even though line-arrows do not connect them; instead the line-arrows represent that these three sub-systems can be part of the GPASS system 10. The foregoing notwithstanding, in at least some instances a line-arrow can represent one component in communication with another, such as the illustrated controller 32 being in communication with the anomaly generation system 26. A person skilled in the art, in view of the present disclosures, will understand how the block diagram conveys both instances in which one component is part of another component and/or instances in which one component is in communication with another component. Further, a person skilled in the art will appreciate other configurations are possible, such as the controller 32 being in communication with other components (e.g., the rotation shaft plant 12, the data acquisition system 18, etc.) in lieu of or in addition to the anomaly generation system 26.

In the illustrative embodiment, the GPASS system 10 includes the rotation shaft plant 12, the data acquisition system 18, and the anomaly generation system 28 as shown in detail in FIGS. 2 and 3. FIG. 2 shows the components of the GPASS system 10 broken down into a block diagram. FIG. 3 illustrates one non-limiting, exemplary mechanical layout of the system 10. As shown, the anomaly generation system 26 includes a static anomaly generator 28 and a dynamic anomaly generator 30, and the dynamic anomaly generator 30 includes a coaxial anomaly generator 40 and an orthogonal anomaly generator 50. The orthogonal anomaly generator 50 can include, for example, one or more of a linear stage 54, a carousel automatic tool changer 58, an end-effector arm 62, and a remote end-effector coupler 80, among other features provided for herein or otherwise known to those skilled in the art in view of the present disclosures.

Starting first with the rotation shaft plant 12, as shown in FIG. 3, the rotation shaft plant 12 includes a rotatable shaft 14 and a housing 16 in which the shaft 14 can be at least partially disposed. The rotatable shaft 14 can be mounted within the housing 16 so as to be rotatable within the housing 16 and can be positioned so as to be effected by anomalies produced by the anomaly generation system 26. In the illustrative embodiment, the rotatable shaft 14 is rotatably mounted on opposing vertical sides of the housing 16. The rotation shaft plant 12 further includes a motor 17 coupled to a first terminal end of the shaft 14 and configured to rotationally drive the shaft 14. The GPASS system 10 is configured to continuously rotate the shaft 14 via the motor 17 while the dynamic anomalies are continuously generated. In the illustrative embodiment, the rotation shaft plant 12 is a test bench model that is utilized in a secure, testing environment for the purpose of studying anomalies in the GPASS system 10. However, the testing conducted on the test bench model of the rotation shaft plant 12 and the results thereof are applicable to real-world use scenarios of a rotation shaft plant.

In the illustrated embodiment, the shaft 14 is driven by the motor 17, for example an electric motor, via shaft coupling 19. Similarly, rotational damping can be introduced electrically, with a second motor 42 of the coaxial anomaly generator 40 that is connected to the other end of the shaft 14. The second motor 42, which can also be called a damping motor, can be considered the source of damping. The damping motor 42 can be connected to a resistor array 13 in which relays can be used so that the resistance can be varied discretely by selectively bypassing resistors. In the illustrative embodiment, the motor 42 is configured to provide external torque to mimic the shaft 14. The damping torque on the motor shaft is proportional to the angular velocity of rotation:

$$T_d(t) = \frac{K_{t,d}^2}{R(t)} \omega_r(t) \quad (1)$$

The electric implementation has more flexibility in varying the damping coefficient, $K^2_{t,d}/R$, and is more robust against sensitive incidental parameter changes that is regular in a fluid-based damper.

Equation (1) above provides a passive way to introduce rotational damping to command the damping coefficient directly. For rotational stiffness and damping, the torque can be commanded as virtual springs or dampers with an active controller using the following two relationships:

$$T_{k,\alpha}(t) = K_r \theta_s(t) \quad (1a)$$

$$T_{d,\alpha}(t) = B_r \omega_r(t) \quad (1b)$$

The data acquisition system 18 can be installed directly on the shaft 14. The system 18 can be configured to probe attributes in multiple domains, such as tension, bending, shear, and torsion of the deformed shaft 14. The data acquisition system 18 can be have a variety of configurations and measure a variety of attributes, such as deformation of the shaft 14. In the illustrated embodiment, it can include at least one sensor 64 (FIG. 4) configured to measure attributes of the rotatable shaft 14 in response to a dynamic anomaly generator 30 generating the at least one anomaly in the shaft 14. In the illustrative embodiment, the at least one sensor 64 may include a sensor attached to an end-effector arm 62 of the orthogonal anomaly generator 50. Specifications for an example implementation of the data acquisition system 18 are described in more detail below.

The GPASS system 10 is able to synthesize both static and dynamic anomalies, where the former is normally introduced by replacing quality components with defected ones, taking place in the rotation shaft plant. Consequently, the plant is designed with modularity to allow quick replacements of components, including bearings, shaft couplings, imbalance masses, and shafts, among other replaceable components of the plant 12. Dynamic anomalies are further categorized into two types, namely, coaxial anomalies and orthogonal anomalies. Unique methods disclosed herein implement each kind. More particularly, the GPASS system 10 includes a dynamic anomaly generator 30 that is able to generate one or both types of dynamic anomalies. In the illustrative embodiment of FIG. 3, the dynamic anomaly generator 30 includes both the coaxial anomaly generator 40 configured to generate at least one coaxial anomaly, and the orthogonal anomaly generator 50 configured to generate at least one orthogonal anomaly.

In the illustrative embodiments, the coaxial anomaly generator 40 can support rotational damping as a coaxial anomaly, as shown in FIG. 3. As discussed above, the coaxial anomaly generator 40 includes the second motor 42 that is operably connected to a terminal end of the rotating shaft 14 opposite the electric motor 17. The second motor 42 is configured to generate at least one coaxial anomaly in the rotating shaft 14 while the shaft 14 continuously rotates. Coaxial anomalies, namely, take effect around the rotation axis 15 of the shaft 14. Moreover, rotational damping can be introduced via the second motor 42, which is configured to provide external torque to mimic the shaft 14.

Figure 4:
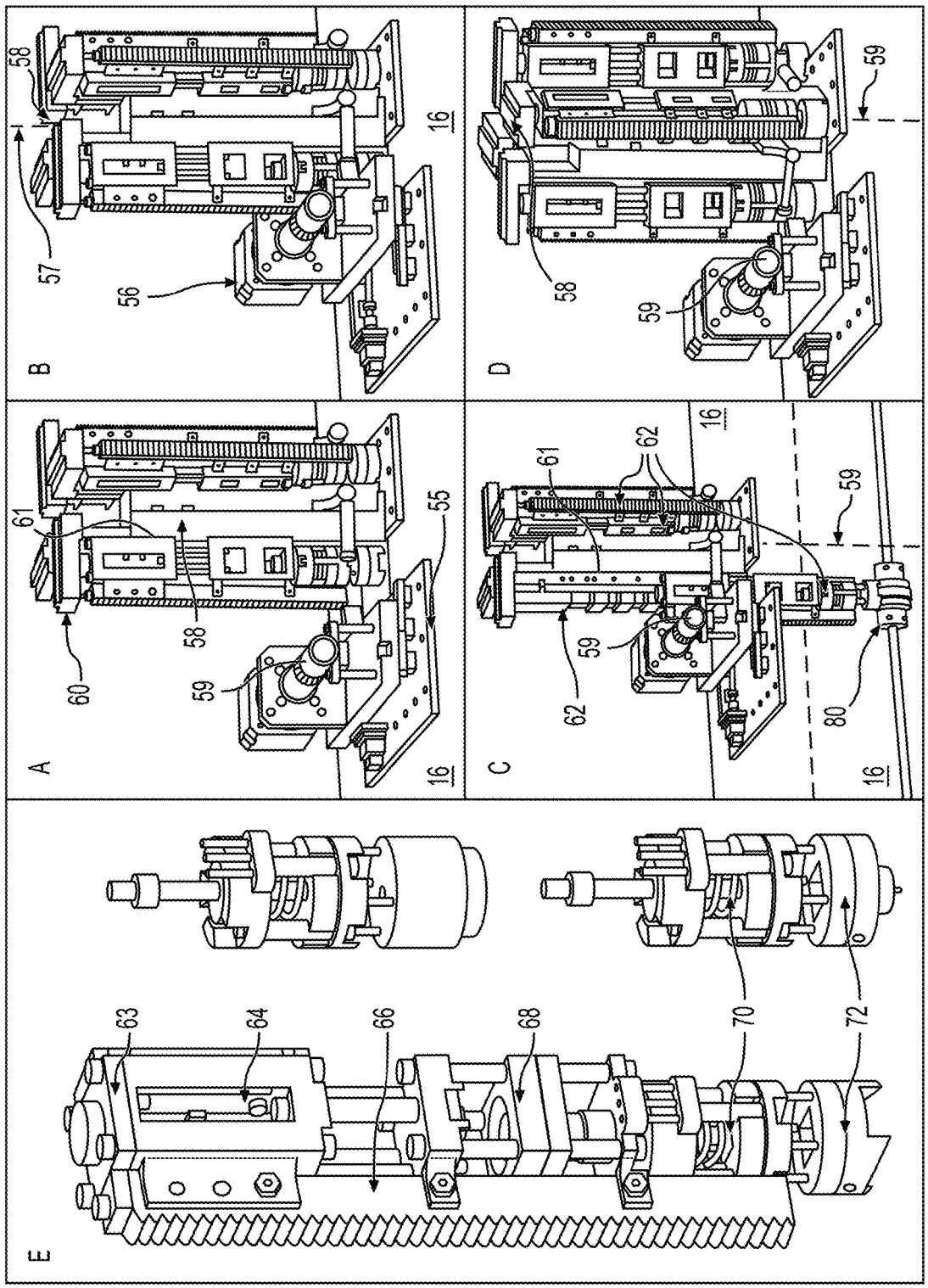
FIG. 4 provides various perspective views of an orthogonal anomaly generator of the GPASS system of FIG. 3 as it is used with an anomaly synthesizing routine, showing that the orthogonal anomaly assembly generator can include an automatic tool changer, a mounting base, a linear stage, an end-effector arm, and/or a remote end-effector coupler.

In addition to the coaxial anomalies generated by the coaxial anomaly generator 40, other anomalies can be synthesized with the orthogonal anomaly generator 50, as shown at least in FIGS. 3-7. The illustrated orthogonal anomaly generator 50 includes three major assemblies, namely a linear stage 54, a bench top carousel automatic tool changer (ATC) 58, and a remote end-effector coupler 80, as shown in detail in in FIGS. 3-5 and 7. The linear stage 54 includes a main actuator 56 that is configured to vertically move an end-effector arm 62 of the automatic tool changer 58 via a rotary-linear transmission to approach the rotating shaft 14. The main actuator 56 of the linear stage 54 may include a geared pinion 59 driven by a motor and configured to engage a rack 66 of the end-effector arm 62 so as to vertically move the end-effector arm 62. The main actuator 56 may be installed on a mount plate 55 which can be fixedly coupled to the housing 16 of the rotational shaft plant 12, as shown in FIG. 4. In one non-limiting embodiment, the main actuator 56 may be a NEMA 17 motor with a 27:1 gearbox. New motors can be easily installed according to the maximum power requirement. The ATC 58 can load i=4 end-effector arms at the same time.

The automatic tool changer 58 may have at least one identical deployment unit 60 arranged radially around a vertical axis 57 substantially perpendicular to the rotation axis 15, as shown in FIG. 4. In the illustrative embodiment, the automatic tool changer 58 includes four deployment units 60 arranged substantially evenly around the vertical axis 57. Each deployment unit 60 includes a slider rail 61, a sliding end-effector arm 62, and a lock 63. A zoomed-in display in FIG. 4, at E, illustrates the integration of an end-effector arm 62. From top to bottom in the illustrated embodiment, the end-effector arm 62 includes the mate of the lock 63, at least one sensor 64 of the data acquisition system 18 (e.g., a force sensor), a rack 66, a carriage 68, a modular mini suspension 70, and an end-effector tool head 72. At least the mini suspension 70 and the end-effector tool head 72 can be modular. The bandwidth of the suspension 70 can be varied, for example, by installing compression springs with different stiffness, and the scope of anomalous modes can be extended by simply installing a new piece of end-effector tool head 72.

The main structure of the orthogonal anomaly generator 50, in particular the automatic tool changer 58, can be installed on an exterior of the rotation shaft plant 12. In particular, the automatic tool changer 58 may be installed on a vertically facing outer surface of the housing 16 as shown in FIG. 3, to ensure minimal incidental interference. More particularly, in the illustrated embodiment the orthogonal anomaly generator 50 is mounted on the housing 16 such that the ATC 58 is rotatable about the vertical axis 57. Thus, a particular end-effector arm 62 that produces the desired anomaly may be rotated into position and aligned with the linear stage 54 and subsequently slidably moved downwardly and into position to effect the desired anomaly.

More particularly, during operation, the synthesis routine of the GPASS system 10 may begin with a first operation in which the orthogonal anomaly generator 50 is in an idle state, shown in FIG. 4 at A. Upon determination of an anomalous scenario, the ATC 58 may face the corresponding end-effector arm 62 associated with the anomalous scenario to the main actuator 56 of the linear stage 54, and the main actuator 56 can be slid into engagement with the end-effector arm 62 in FIG. 4 at B. The selected end-effector arm 72 can be actuated by the main actuator 56 of the linear stage 54. In the illustrative embodiment, high-precision rack-and-pinion transmissions, namely the pinion 59 of the main actuator 56 and the rack 66 of the end-effector arms 62, can be used to allow trivial set up between the actuator 46 and different arms 62 during the automatic tool change. In the illustrated embodiment, the rack 66 is installed on a lateral side of the end-effector arm 62 and is positioned to interact with gears of the main actuator 56. The carriage 68 can be configured to slidably move along the slider rail 61 when the main actuator 56 engages the rack 66 such that the end-effector arm 62 moves in the vertical direction. The anomaly process may take place in FIG. 4 at C, where the end-effector arm 62 can extract and the tool head 72 can be in action with the remote end-effector coupler 80 to synthesize the anomalous scenario. FIG. 4 at D demonstrates an exemplary execution of the automatic tool-changing process. A person skilled in the art will appreciate other configurations of the ATC 58, and components thereof and/or associated therewith, are possible to allow for various implementations for changing tools.

The on-board ATC 58 in the orthogonal anomaly generator 50 allows essentially limitless modes of anomalies to be introduced in the substantially direction normal to the rotation axis 15 of the rotatable shaft 14. Described in detail below is the realization of large normal force (N-mode), active vibration (V-mode) and destructive scratching on the rotating shaft with the orthogonal anomaly generator 50.

Figure 5:
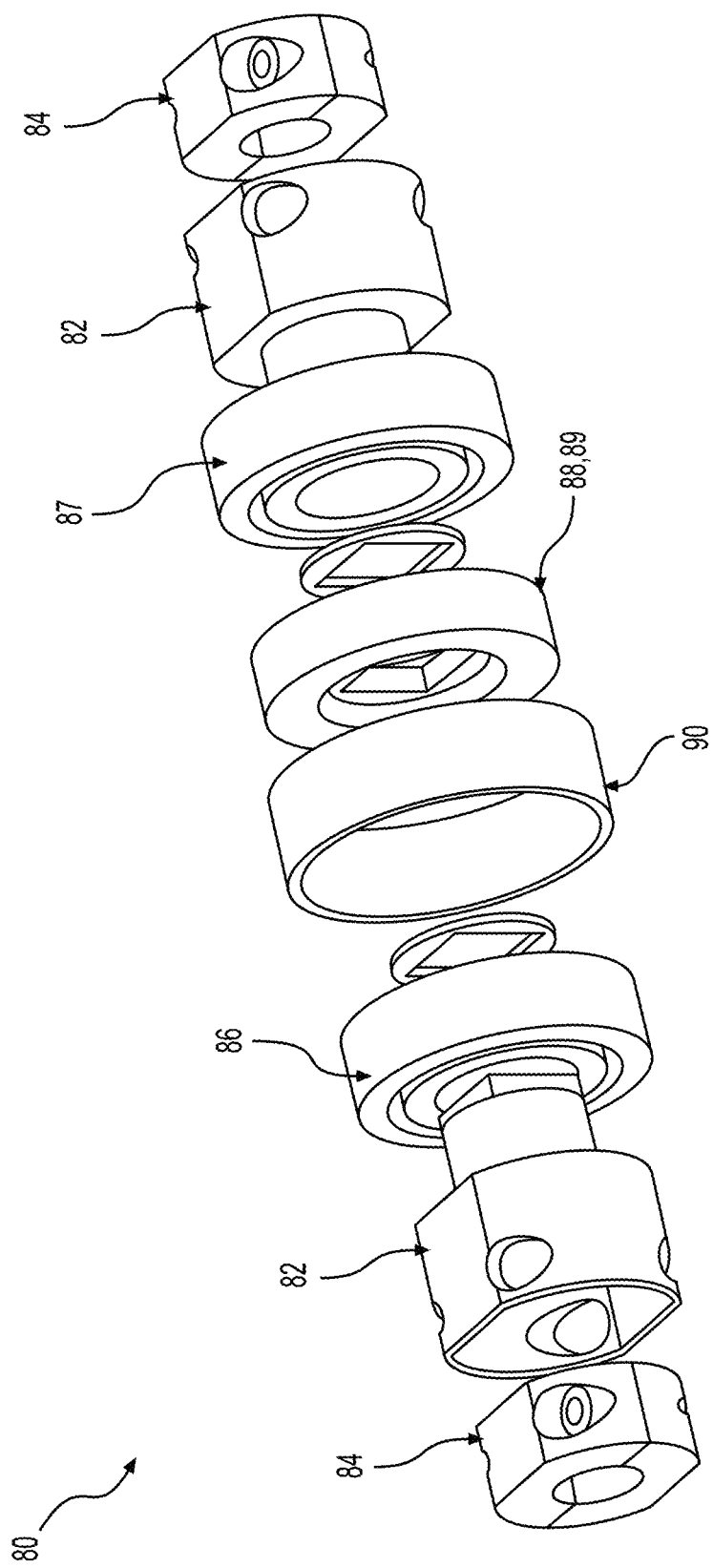
FIG. 5 provides an exploded view of the remote end-effector coupler of FIG. 4.
Figure 6:
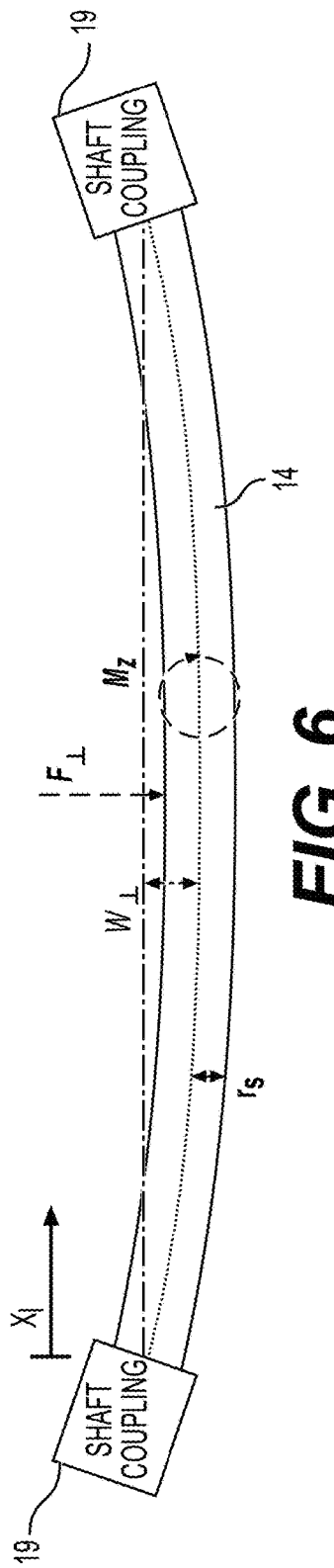
FIG. 6 is a schematic illustration of a Euler-Bernoulli beam model for a shaft of the GPASS system of FIG. 3 under static condition.

Another component of the orthogonal anomaly generator is the remote end-effector coupler 80 that is installed on the shaft 14, as shown in FIGS. 5 and 6. In the illustrative embodiment, the remote end-effector coupler 80 includes a rapid prototyped case 82 and shaft clamps 84 arranged at terminal ends of the coupler 80. The shaft clamps 84 may be affixed to the shaft 15 so as to couple the coupler 80 to the shaft 14. A contact port 86 can be provided in a central portion of the remote end-effector coupler 80. The contact port can have high-radial-load ball bearings 87, a contact-less port 88 having magnetic metal/permanent magnets 89, and an extendable port 90 for in-reversible anomalies. During synthesis process, the physical inputs from the end-effector tool heads 72 can be delivered to the remote end-effector coupler 80 instead of the shaft 14 to standardize the synthesis process.

Figure 7:
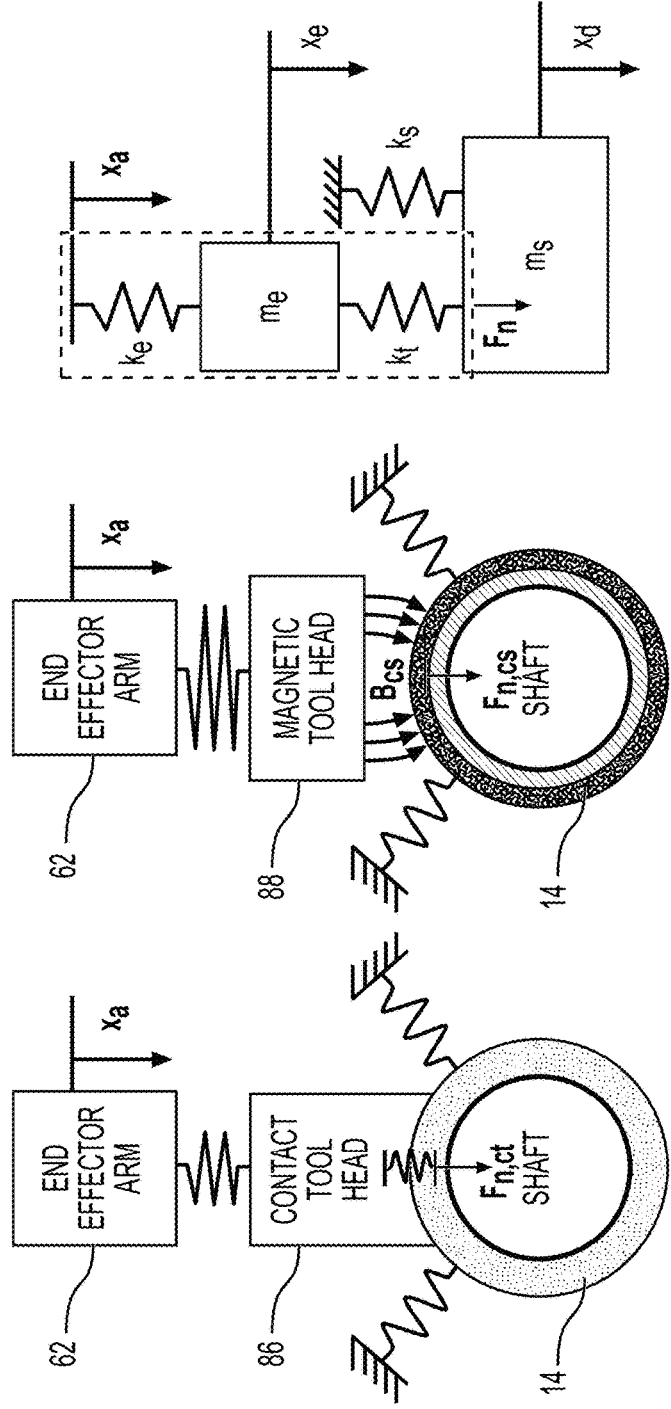
FIG. 7 is a schematic illustration that includes block diagrams providing a component breakdown of an exemplary electronics setup for a GPASS system based on the present disclosures.

The inputs can be delivered via contacts 86 or in a contactless way 88 as shown in FIG. 7. Thus, the remote end-effector coupler 80 includes a contact port 86, which includes multiple high-radial-load ball bearings 87 to diminish unideal frictional torque on the shaft from contact. The contactless port 88 can be an integrated piece of ring-shape rare earth magnet 89. In the illustrative embodiment, the contact-less port 88 is in the shape of a ring, although other configurations are possible. The physical inputs can be delivered via an electromagnetic tool head to the contactless port 88 to completely avoid frictional torque thanks to the symmetry of the disk within the magnetic field of the end-effector 62. A modular expendable shell can also be integrated in the remote end-effector coupler 80. Such a shell can serve as a sacrificial layer for destructive anomalies.

The dynamic anomaly generator 30 can be configured to generate and process anomalous events via a controller 32, the coaxial anomaly generator 40, and the orthogonal anomaly generator 50. In particular, the dynamic anomaly generator 30 can be configured to recognize an anomalous event that is being synthesized, and subsequently quantify and record descriptive information regarding the anomalous event, as well as attributes of the rotatable shaft 14 measured by the data acquisition system 18. The dynamic anomaly generator 30 can also be configured to further process the recorded data via the controller 32: It should be understood that the functionality of the controller 32 may be implemented using a computing device that provides or includes a processor connected to a user interface, computer readable memory, and/or other data storage and a display and/or other output device. Computer executable instructions and data used by a processor may be stored in the computer readable memory included in the computing device or implemented with any combination of read only memory modules or random access memory modules, optionally including both volatile and nonvolatile memory.

Specifically, the dynamic anomaly generator 30 can utilize the recorded data to generate dynamic labels in real time. Each dynamic label can be included in a time series in at least one time variant anomaly system, and can be generated dynamically in real time as the anomalous event is occurring. Then, for example, if the system were to transition to a different anomalous event, the dynamic anomaly generator 30 can be configured to begin recording, even instantaneously, event data and generating dynamic labels for the new anomalous event. In some embodiments, a single label can be provided for every time step (sometimes referred to as a time stamp) of the anomalous event process. Specifically, the dynamic anomaly generator 30, via the controller 32, can be further configured to generate at least one time step associated with each anomaly, and the at least one dynamic label for each anomaly can be generated for each time step of the at least one time step. In other embodiments, the dynamic anomaly generator 30 may only generate labels for some of the generated anomalies. That is, the descriptions herein, including the claims, directed to the dynamic anomaly generator 30 creating dynamic labels for "each" anomaly is not so limiting as to require that each and every anomaly be labeled accordingly.

The labels that are generated by the dynamic anomaly generator 30 can include descriptive information regarding the anomalous event that may be utilized for supervised learning or machine learning. In particular the GPASS system 10 can be configured to perform machine learning over time regarding various anomalous events that occur in the rotational shaft plant. In machine learning, data set labeling can be a process that includes labeling raw data with informative details regarding that piece of data. A machine learning model that uses supervised learning can require labeled data sets that the model can learn from and iterate on. Thus, the capability of the dynamic anomaly generator 30 to generate dynamic labels for the anomalous events can greatly improve the machine learning process. At least one non-limiting implementation of optimized anomalous datasets capable of improved labeling and machine learning is described below.

GPAD Dataset

A General-Purpose Anomaly in Physical Domain (GPAD) dataset is described herein. It is a collection of time-series sequences of sensor signals, during which a physical plant, such as the GPASS system 10, experiences multiple modes of anomalies that are actively planned, introduced, and recorded. The anomaly synthesis process is carried out by the GPASS system. The proposed dataset is substantial in several aspects. First, it offers an extensive anomaly space on a general-purpose plant, rotary equipment. In addition to the fundamental practice to include static (or time-invariant, i.e., TI) anomalies, such as imbalanced inertia and defective ball bearings in, the proposed dataset includes operating conditions under three modes of dynamic (or time-variant, i.e., TV) anomalies: rotational damper behavior; static shear load; and vibratory shear load. Other modes, and other number of modes (more or less than three) are possible. The automated anomalous modes can be selectively combinable, for example, by a Markov-Chain (MC) model, and the respective distribution of each mode can be customizable. Second, the dataset can uniquely include real-time labeled anomaly ground truth. Embedded electronics in the anomaly-generating mechanisms can acquire multi-dimensional anomaly attributes at a synchronized rate with the plant. Third, the proposed dataset can contain high-dimensional observer features. More than 20 streams of signals from a perception system of the plant and five others from anomaly-generating devices can be acquired at each step to describe the operating condition. Still further, the GPAD dataset can be easily scalable and evolving. Additionally, the anomaly synthesizer can be designed with an expedited automated experimental pipeline to scale up dataset volume rapidly.

As discussed above, the coaxial anomaly generator 40 can simulate rotational damping behavior (D-mode) by actively commanding a coaxial motor's 42 resistance to alter the passive damping torque exerted on the shaft. The other two dynamic mode anomalies can be in the orthogonal direction, which includes dynamic shear loading (N-mode) and vibratory excitation (V-mode), both of which can be conducted by the orthogonal anomaly generator 50. The N-mode can focus on large and stationary shear load, while the V-mode can emphasize high-frequency vibratory shear load. Additionally, the apparatus 10 can support the modular end-effector tools (sometimes referred to as end-of-arm tools) 72 for N and V-mode anomalies. The end-effectors allow a finer level of anomaly mode, such as ideal shearing, realistic shearing, grinding, and/or scratching. Some critical end-effectors are explained as follows: Realistic Shear (RS), which is shear load with counter torque; Ideal Shear (IS), which is shear load with minimal counter torque; Scratch (Sc), which is detrimental contact between shaft and the end-effectors; and Overhang (H), which is component in loose contact with the shaft.

The GPAD dataset can uniquely provide accurate real-time labeling of the ground truth health condition. For every time step n, the health condition labels can be formatted as: $Y_a(n)[0]$ is Macro Health Mode K ∈ {S: ={H, A}; $Y_\alpha(n)$[1] is Sub-level Mode k ∈ s: =H, D, {$N_e$}, {$V_e$}; and $Y_\alpha(n)$[2] is Numeric Attribute $y_k \in Y_k$; k ∈ s.

The hierarchical labels can fulfill distinct needs for AD&HM applications. Potential usages include binary classification between healthy (H) and anomalous (A) modes, multi-class classification of sub-level health modes, and regression to estimate severity within a sub-level mode. The coaxial damping coefficient, end-effector force, and active vibration frequency are the attributes for D, N and V-modes, respectively.

In addition to the novel label space, the GPAD dataset comprises a high-dimensional observer space readily available as features for data-driven applications. Aside from the sensing elements in the dynamic anomaly generator 30, a sensor and perception system, including embedded electronics in the plant and an onboard wireless sensor 64, can directly observe the state of the plant. Altogether, a $X_s(n) \in R^{23}$ signal vector can be observed and recorded for every time step. The feature and label recordings can be synchronized during the synthesis and reaffirmed during post-processing. Specifically, the plant and dynamic anomaly generator can sample at rate $f_a=(\delta t_a)^{-1} \approx O(1 \text{ MHz})$, while the wireless sensor can sample at a safe frequency, e.g., $f_s=(\delta t_s)^{-1} \approx O(100 \text{ Hz})$, to ensure limited to no queuing delay takes place. The sampled time steps can be denoted as $n_a$ and $n_s$, respectively. The $n_a$ time-axis can broadcast over all other components during the synthesis process and can be anchored as the absolute time axis.

Figure 10:
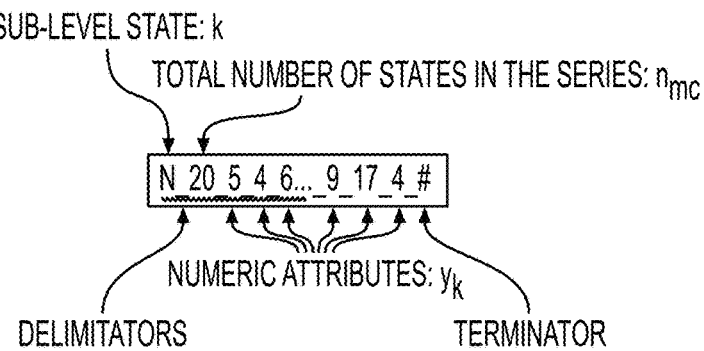
FIG. 10 is one example of a predefined communication protocol that can be used in conjunction with packing a sampled anomaly space trajectory.

The GPAD data generation pipeline can include multiple stages, including distribution definition, anomaly sampling and encoding, anomaly synthesis and data acquisition, and post-processing. The synthetic anomalies typically only transmit within the attribute space of a single sub-level mode. To define the sequential anomalous attributes, a Markov-Chain model is assumed for each individual sub-level mode k, whose model parameters are $\Theta_k=\{Y_k, \pi_k, A_k\}$. The attribute space, $Y_k$, summarizes possible discrete values of damping motor resistance, end-effector shear load magnitude, and active vibration frequency, with $y_k=0$ indicating a healthy sub-level mode. The initial distribution and transition matrix can be defined as:

$$\pi_k(i) = \mathbb{P}\{y_k(0)=i\}$$

$$A_k(i,j) = \mathbb{P}\{y_k(n_m+1)=j | y_k(n_m)=i\} = \alpha_{ij}$$

where $i \in Y_k$, and nm denotes the time steps of the Markov-Chain model. The anomaly sampling process generates the trajectory of sequential anomalies base on the MC model, during which the anomaly duration Ta is equally segmented into max (nm) time bins, such that each anomaly attribute lasts $\delta t_m = T_a \cdot \max(n_m)^{-1}$ seconds in real-time. The sampled anomaly space trajectory can be packed according to the predefined communication protocol provided for in FIG. 10, and can transmit to the master computer of the synthesizer, which can then unpack the packet and assign the trajectorial information to the anomaly generator. In the anomaly generation stage, the apparatus can automatically carry out anomaly syntheses, for example with the help of the ATC 58. The observation signals from the perception system and anomaly space labels from the dynamic anomaly generator 30 can record in real-time on their respective hardware. Upon completion of the synthesis process, signals from all devices can merge on the host computer and feed into the post-processing stage, during which redundant attributes can be removed, and synchronization can be reaffirmed. Eventually, valid data sequences are stored in the dataset archive.

An anomaly synthesis process can be carried out to illustrate the proposed pipeline. The shaft can operate normally, for example at an angular velocity $\omega_r = 200$ RPM. A V-mode synthesis with an ideal shear end-effectors, e=IS can be used, in which case the following apparatus configuration can be applied:

$$f_\alpha = 1000 \text{ Hz}, f_s = 65 \text{ Hz}, T_\alpha = 20s,$$

The Markov-Chain model parameters can be pre-defined as:

$$|Y_{V_{IS}}| = 31, \pi_{V_{IS}}(0) = 1, \max(n_m) = 20,$$

$$\delta t_m = T_a \cdot \max(n_m)^{-1} = 1s,$$

$$A_{V_{IS}}(i, j) = \begin{cases} 0.9, \forall i = j \\ 0.1 \cdot (|Y_{V_{IS}}| - 1)^{-1}, \forall i \neq j \end{cases}$$

An anomaly trajectory can be sampled from this distribution. The converted packet can be, for example:
V_20_6_6_6_6_6_28_28_28_28_28_28 . . . _28_28_28_28_27_27_27_27_27_#
and can feed into the anomaly synthesizer interface. A synthesis process can automatically carry out accordingly.

Figure 11:
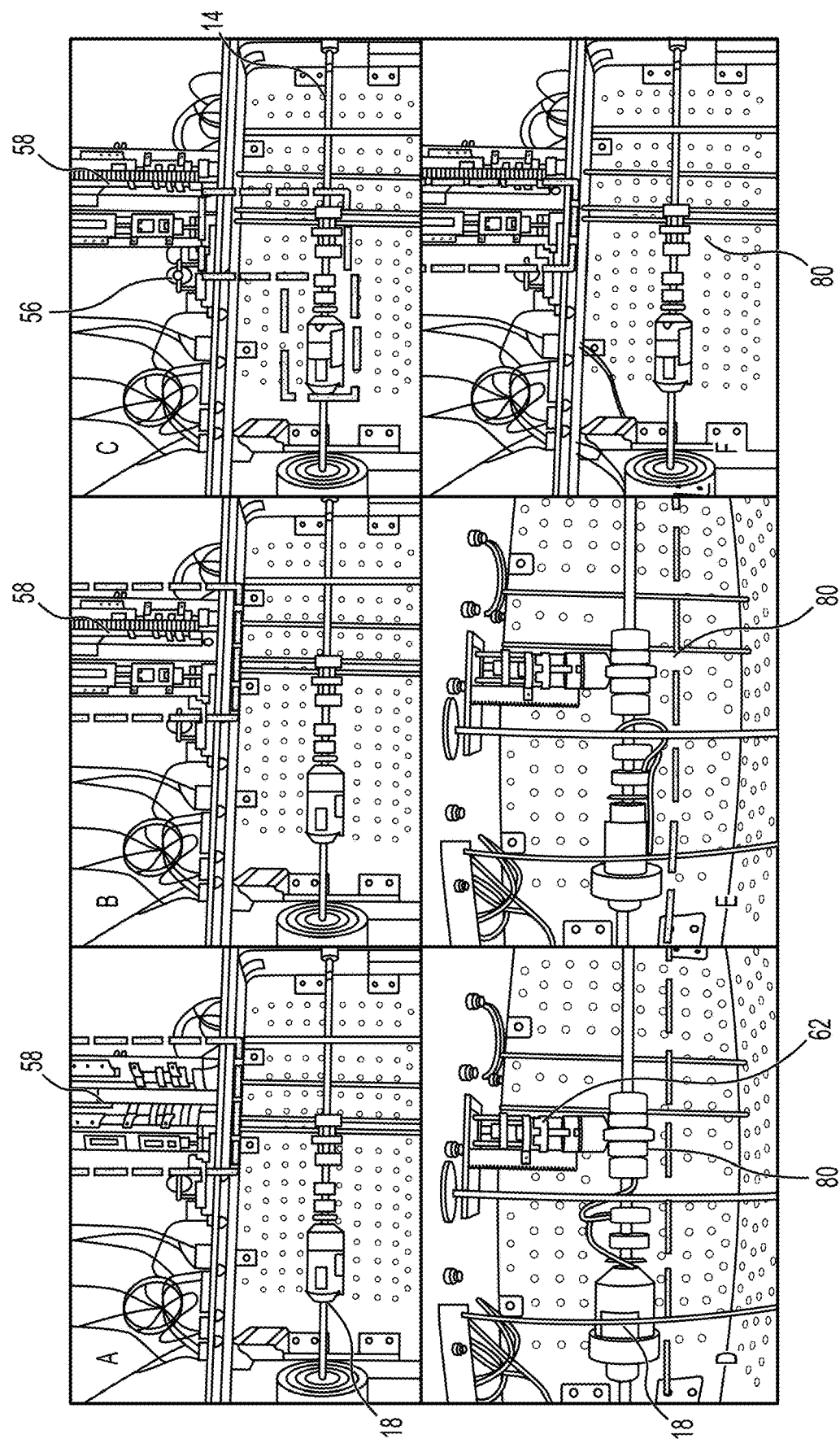
FIGS. 11A-11F illustrate side views of one embodiment of the GPASS system of FIG. 3 progressively going through different stages of an exemplary synthesis process.

FIG. 11 depicts the apparatus of the GPASS system 10 described above as the synthesis process progress through different stages. Between FIGS. 11A and 11B, the ATC 58 selects the desired end-effectors 72 based on the packet. FIG. 11C depicts the end-effector 72 positioning and sensor initialization processes, during which the end-effector 72 is pre-positioned to be in bare contact with the shaft and the onboard sensor starts data logging, respectively. Next, the plant warms up in FIG. 11D to a desired angular velocity. The end-effector 72 introduces a time-varying vibratory shear load to the shaft as the automated anomaly synthesis takes place in FIG. 11E. The bending deformation on the shaft is clearly depicted between the dashed reference lines in FIG. 11 D and FIG. 11E. Upon completion, the apparatus can home to its idle configuration in FIG. 11F.

Figure 12:
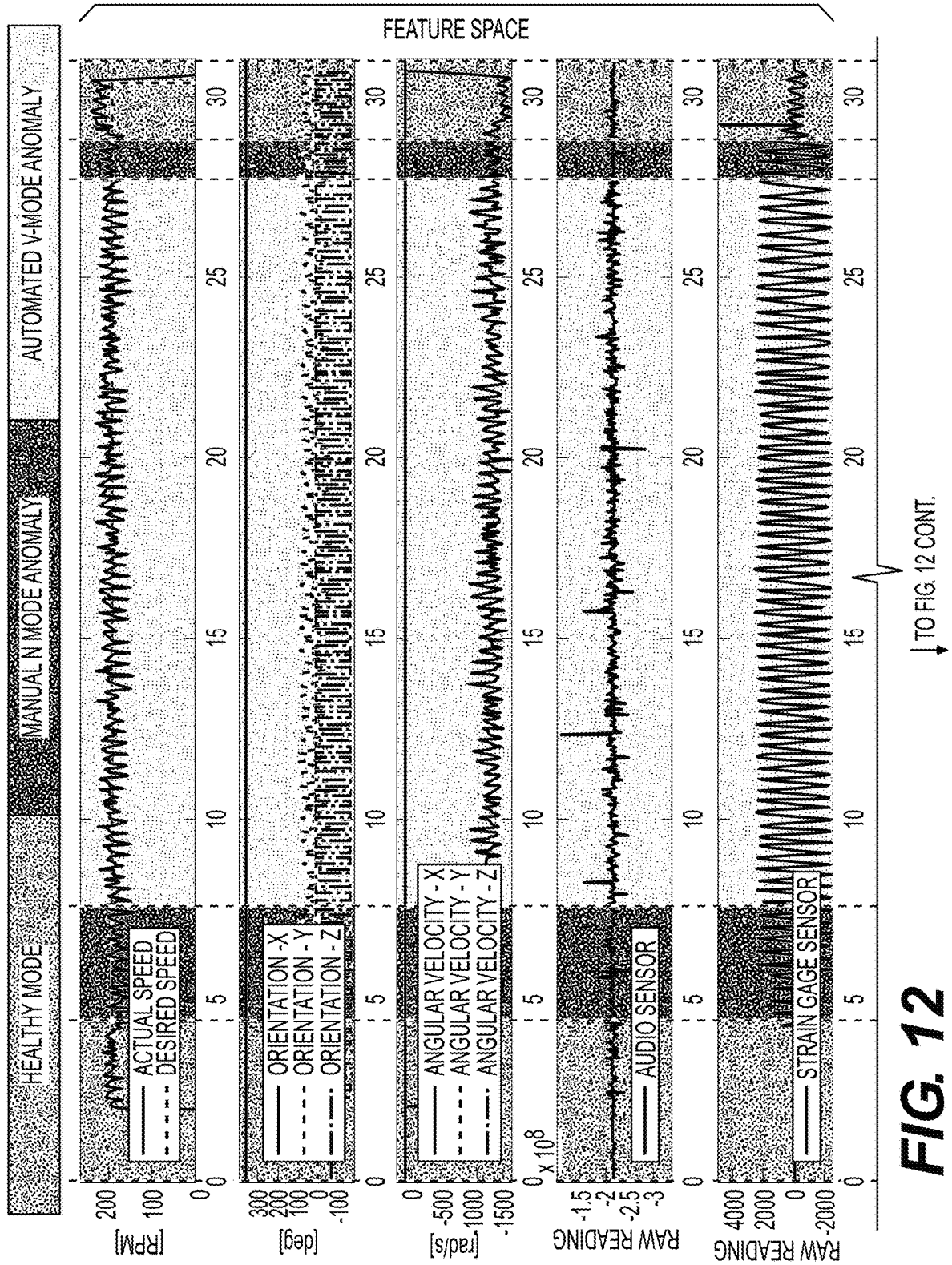
FIG. 12 illustrates one raw data sequence generated by the GPASS system of FIGS. 11A-11F.
Figure 12:
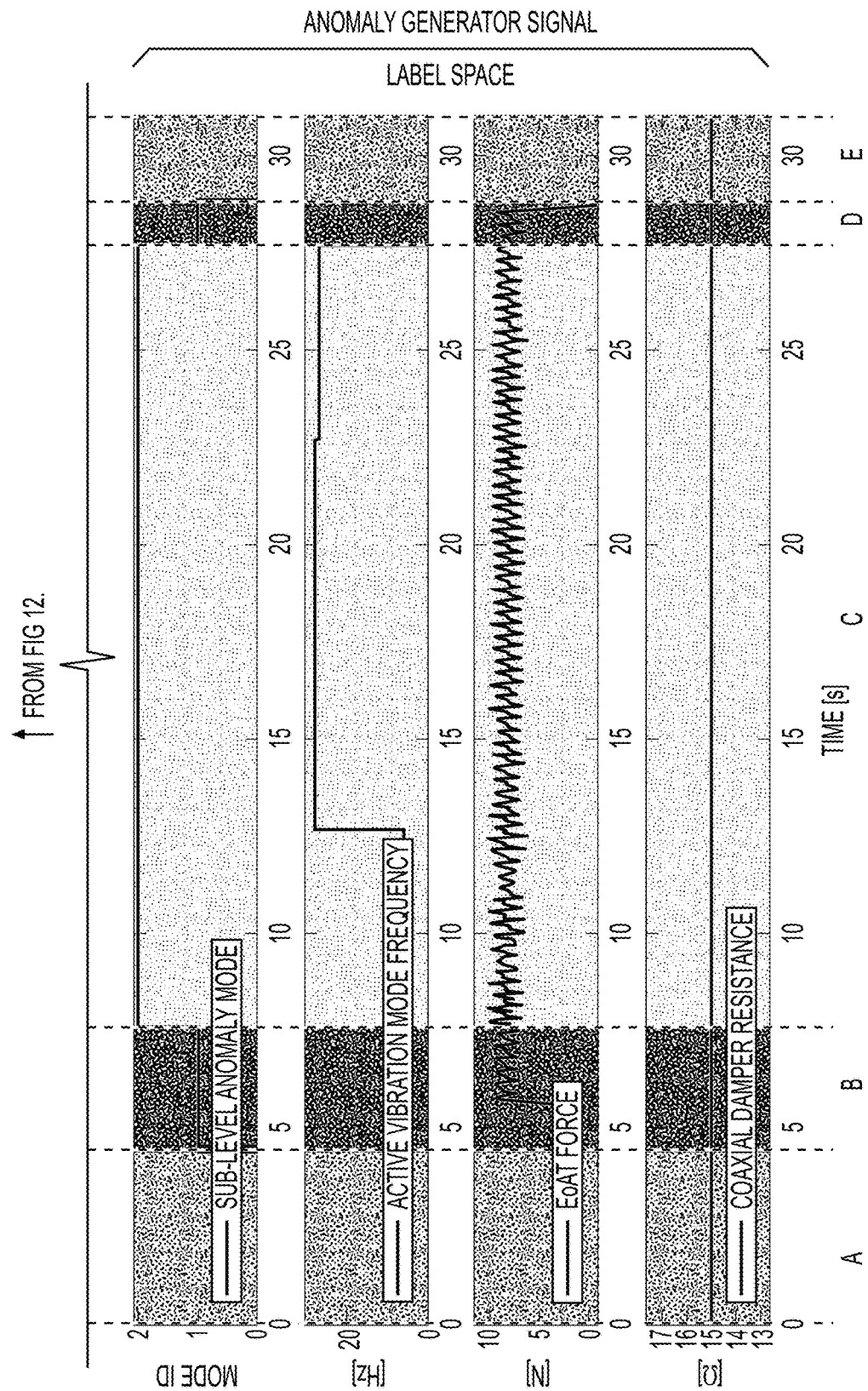

Empirical data demonstrates the real-time data-generating capacity of the synthesizer. FIG. 12 illustrates the raw data sequence generated above. Color-coding can be integrated according to the sub-level anomaly mode from the anomaly generator signal as a visualization effort, although that will not be apparent from the grayscale images provided. The periods can be different colors, although they do not each have to be a different color. For example, in the illustrated embodiment, the color coding of periods A and D are the same, representative of a healthy mode, as are the color coding of periods B and E, representative of a manual N-mode anomaly. C is different than each of A, B, D, and E and is representative of an automated V-mode anomaly. The observations from the wireless sensor and the plant make up the feature space that objectively describes the state of the plant. The label space includes signals collected by the anomaly generator. Specifically, the four label space sequences in FIG. 12 demonstrate the sub-level anomaly mode and the numeric attributes of N, V, and D-modes, respectively.

The feature space illustrated in FIG. 12 refers to what a conventional machine will plant. The feature space includes all of the data collected by a conventional plant's data acquisition system, and is also the space included in other conventional anomaly synthesizers. The feature space may include attributes that describes the plant's operating condition, such as the shaft's orientation, angular speed, angular acceleration, surface strain, etc. In the case of the GPASS system 10 described herein, the system uniquely further includes a label space. The label space is advantageous in that other anomaly synthesizers lack the capacity to quantify and label the anomalous events in real-time. In this case, the label space contains all the information that describes the anomalous events, such as the type of anomaly (N, V, D modes) and the significance of the anomaly (numeric attributes such as damping coefficient and lateral force magnitude). These two spaces are referred to as a label space and a feature space because, when training with artificial neural networks, the content can be used as training labels (outputs) and training features (inputs), respectively.

The GPAD data sequence distinctively reflects the workflow without any data processing. In detail, period A of FIG. 12 records the plant warm-up process, as the shaft stabilizes at the commanded 200 RPM. The end-effector 72 extends to form approximately 10 N shear contact with the shaft during period B. This duration can be intuitively labeled as manual N-mode synthesis. The Markov-Chain V-mode synthesis can be automatically carried out over period C, during which in the illustrated instance vibration frequencies of 6 Hz, 28 Hz, and 27 Hz are delivered to the shaft consecutively. Period D in FIG. 12 reflects the anomaly generator homing stage as the end-effector 72 retracts to reset the plant to a healthy state. In period E, the plant resets to its idle state. In the present instance, because no D-mode anomaly is commanded, the damper resistance stays constant throughout the process.

The dynamic behaviors of the N, V, and D-modes can be validated via respective analyses. The effectiveness of N-mode synthesis process to deliver commanded constant shear loads is known to those skilled in the art, so the present disclosure focuses on the other two sub-level modes.

Figure 13:
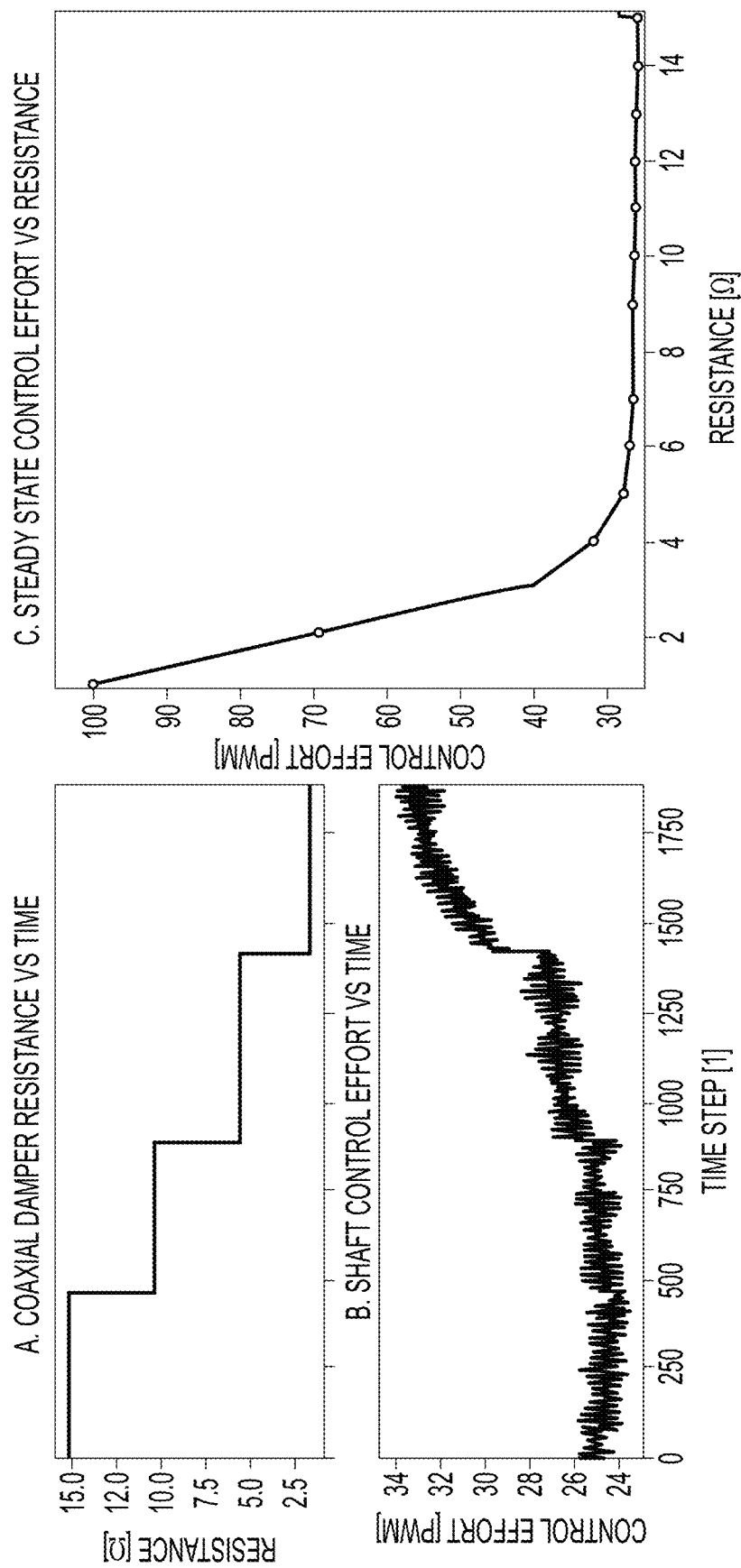
FIG. 13 illustrates one desired anomaly trajectory of a manual D-mode synthesis process in accordance with the present disclosures.

FIG. 13 illustrates the desired anomaly trajectory of a manual D-mode synthesis process. In theory, there is a reciprocal relationship between control effort and damper resistance. As clearly depicted in the comparison of coaxial damper resistance vs. time in (A) of FIG. 13 and the comparison of shaft control effort vs. time in (-B) of FIG. 13, to maintain a desired angular velocity, the plant provides an increasing control effort to counteract the increasing damping coefficient led by the decreasing coaxial motor resistance. The steady-state control effort for all possible motor resistances is demonstrated in the comparison of steady state control effort vs. resistance in (C) of FIG. 13. The reciprocal trend validates the successful introduction of D-mode anomaly.

Figure 14:
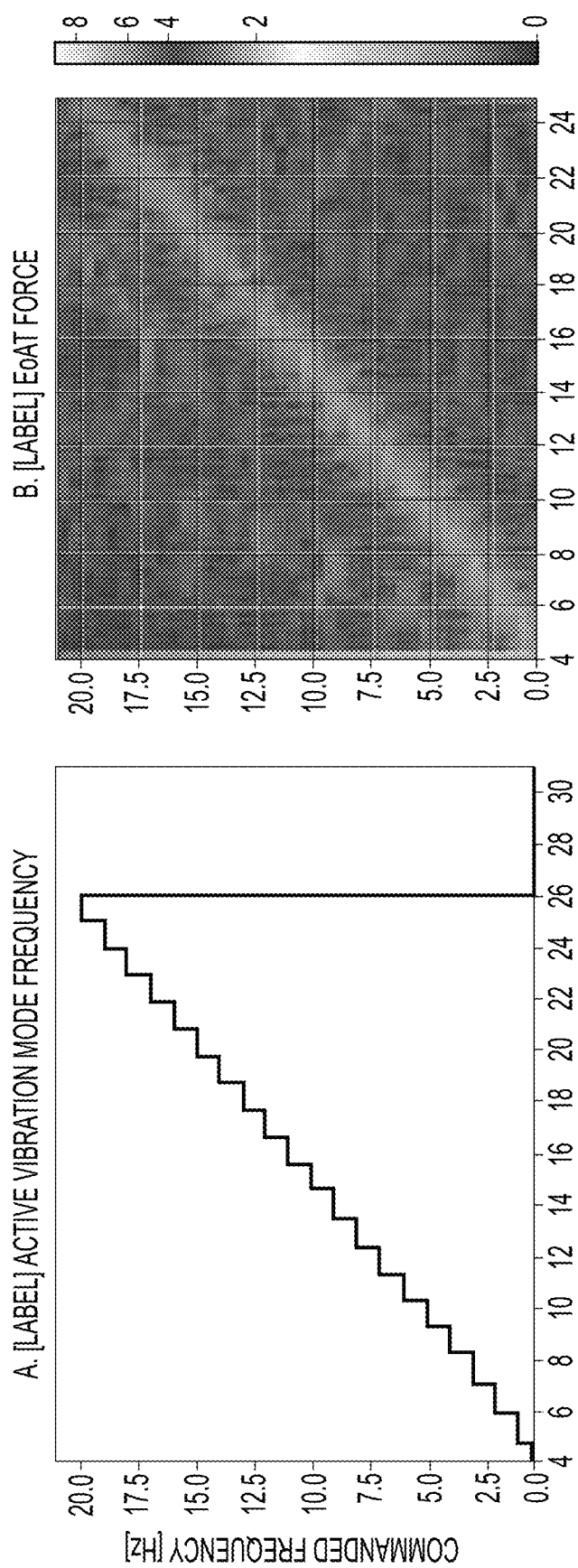
FIG. 14 illustrates one desired anomaly trajectory of a manual V-mode synthesis process in accordance with the present disclosures.
Figure 14:
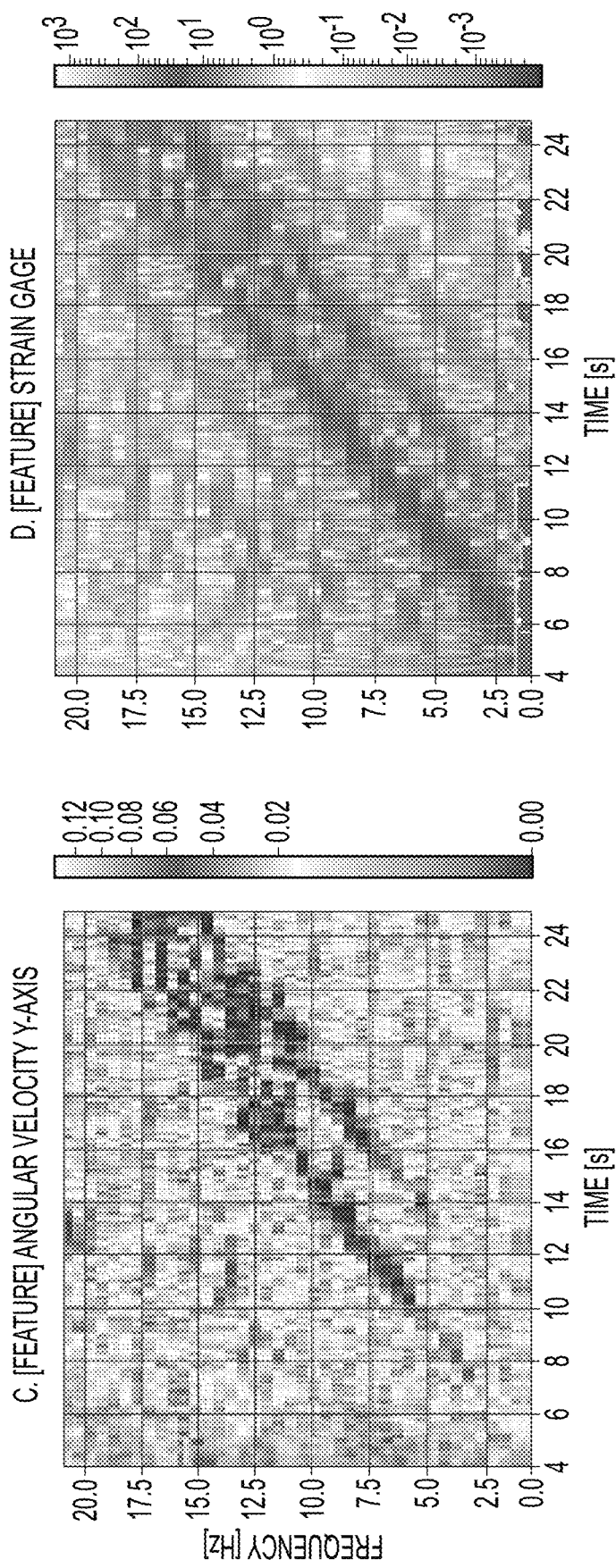

Further, V-mode synthesis in the GPAD dataset is proved to be accurate. An automated V-mode synthesis is conducted, following a reference ramping frequency trajectory in the active vibration mode frequency graph of (A) of FIG. 14, plotting the commanded frequency over time (in seconds). The plant can be commanded stationary to avoid overwhelming frequency components induced by the rotation of the shaft. Three sequences of time-series signals, including one from the label space and two from the feature space, can be used for Short-time Fourier Transform (STFT) analysis. The STFT results are displayed in (B), illustrating an end-effector force by plotting the force against time (in seconds), (C), illustrating an angular velocity Y-axis by plotting the frequency against time, and (D), illustrating a strain gauge by plotting strain against time, of FIG. 14. In all three signal sequences, the dominating power spectrum signals can follow exactly the commanded V-mode in both frequency and time domains, thus tractably validating the V-mode synthesis is correctly delivered to the plant and captured by the perception system.

Unsupervised methods are widely applied for data-driven AD&HM due, at least in part, to the scarcity of anomaly space labels. Unsupervised methods can be categorized, for example, as distance-based, clustering-based, and classification-based measures. In one study conducted in conjunction with the present disclosures, the Matrix Profile (MP), a distance-based method, is applied to illustrate GPAD data. The Matrix Profile method can efficiently compute the minimum distance between subsequences of a particular time window, $n_w$, within one time-series data sequence. A high MP value indicates the feature subsequence, $X_s$ (n: n+$n_w$), can hardly find another subsequence with a similar profile, and vice versa. Subsequences with high MP values are called discords. Commonly, a hyper-parameter m is defined such that top m discords indicate the presence of anomalies.

Figure 15:
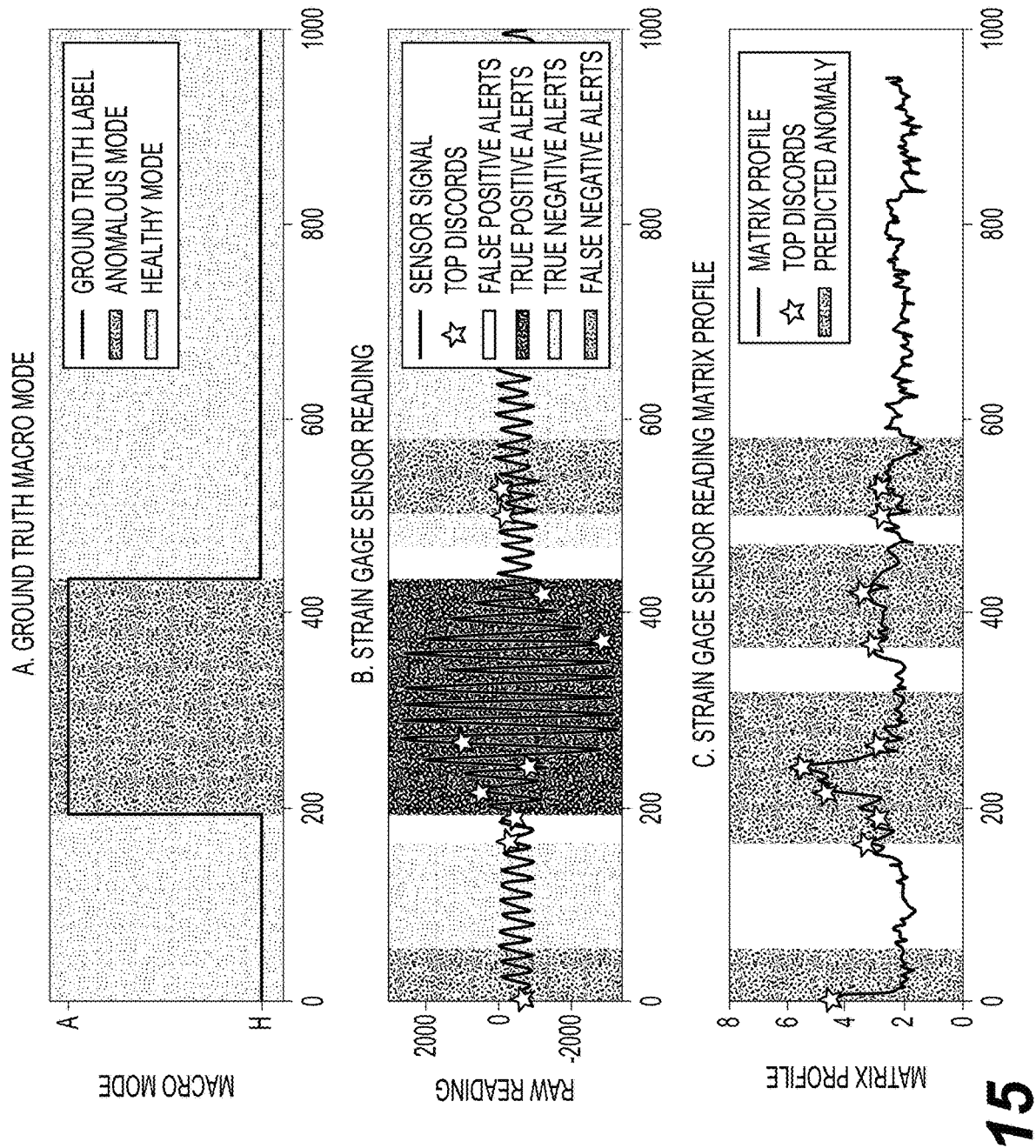
FIG. 15 illustrates one data sequence that includes a single anomalous subsequence randomly sampled from a dataset in accordance with the present disclosures, demonstrating an AD&HM application with a computed matrix profile.
Figure 15:
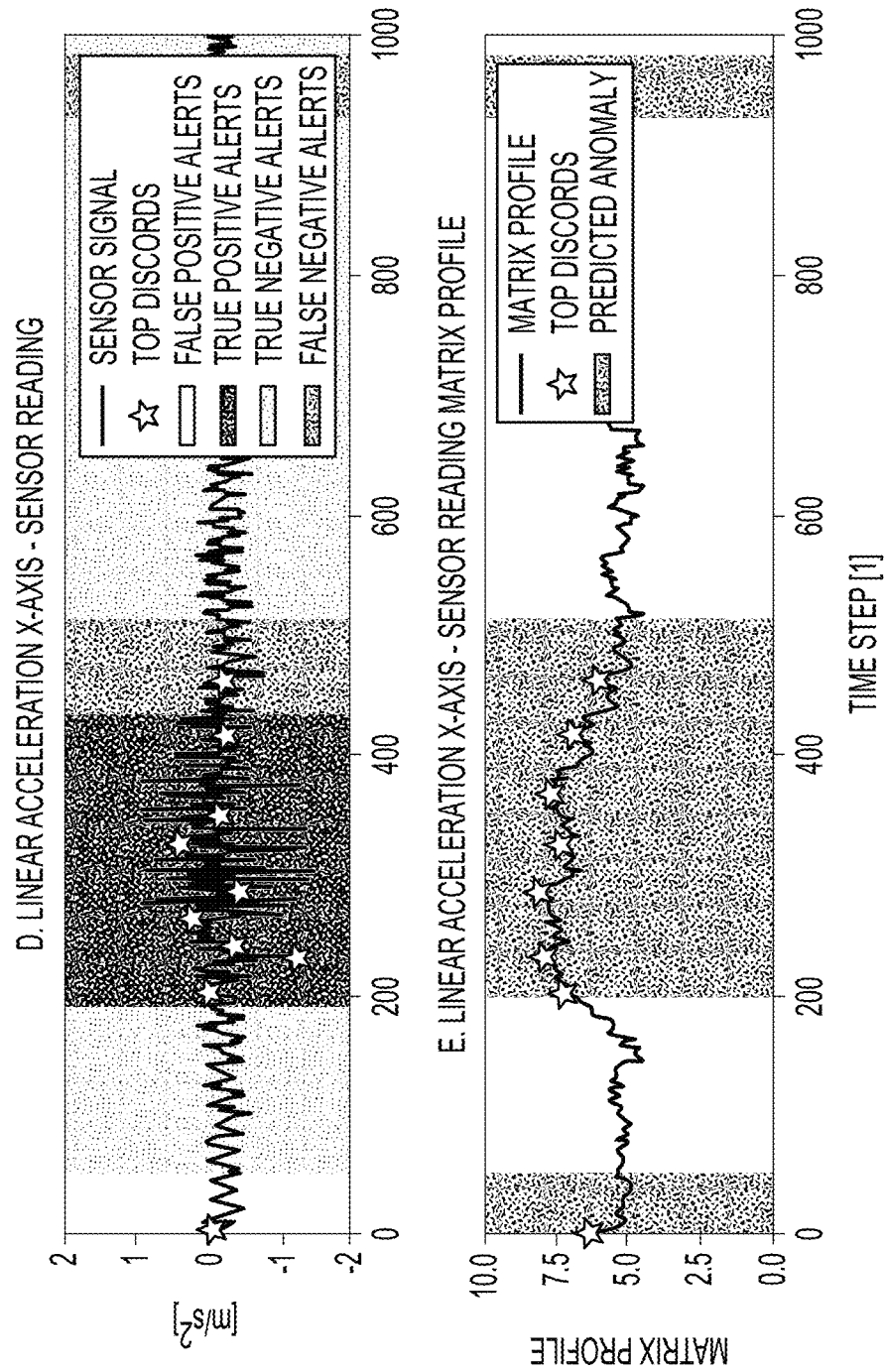

The GPAD sequence demonstrates good predictive capacity even with a primitive MP analysis. A baseline MP analysis with $n_w$=50 and m=10 can be applied on a sequence of GPAD data. A data sequence that includes a single anomalous subsequence can be randomly sampled from the dataset. As indicated in the graph (A) of FIG. 15, an anomaly can be introduced to the plant from approximately n=about 200 to n=about 425. MP analysis can be applied on two time-series features—the strain gage sensor reading and linear acceleration-whose raw signals are demonstrated, for example, in graphs (B) and (D) of FIG. 15, respectively. The computed Matrix Profile for the two readings are shown in graphs (C) and (E) of FIG. 15. They can also include color-coded predicted anomalous subsequences according to the top m discords (the color-coding not being as dynamic in the grayscale images associated with the present disclosure). The considerable amounts of overlapping regions between prediction and ground truth in graphs (B) and (E) of FIG. 15 validates the true positive alarms. Additionally, both predictions can raise alarms at the start of the actual anomaly. However, it can be impractical to ignore false alarms. For example, about 30% of the anomaly alarms can be false positive. These are led by the arguably primitive nature of the MP algorithm, and further discussions are not the focus of the present disclosure. In conclusion, the good AD&HM result, including considerable amount of true and timely alarms, from the disclosed MP application demonstrates the good predictive capacity of the GPAD dataset.

Various machine learning techniques such as Multilayer-Perceptron, Convolutional Neural Network, Recurrent Neural Network, and Transformer can be applied to GPAD datasets to achieve anomaly detection and health monitoring. Below one, non-limiting example of machine learning techniques using Long-Short-Term-Memory, a kind of Recurrent Neural Network, is provided. A person skilled in the art will appreciate, however, other machine learning techniques, including but not limited to those identified herein, can be utilized with the GPAD datasets described herein.

Long-Short-Term-Memory is a baseline machine learning model for time-series prediction that can be used due to its efficient deployment and handy performance. It adopts a recurrent neural network architecture that takes sequential uni- or multi-variate inputs and outputs a prediction for a single time step (many-to-one), $\hat{Y}$, or for a sequence (many-to-many), $\hat{Y}$ (n). For AD&HM time-series datasets, which are rarely labeled, a common approach uses future signals as training labels, called the sequence to supervision (seq2sup) trick. Specifically, with a hyper-window length nw, for every time step n, the features for training are $X_s$(n: n+$n_w$), and the training label is Y(n):=$X_s$(n+$n_w$+1). The objective function can be to minimize the distance between model prediction, $Y^{\wedge}$(n)=LSTM $X_s$ (n: n+$n_w$), and the training label, Y (n). For AD&HM purpose, a minimalist method can include applying a threshold to the distance metric between the incoming signal and the model prediction in the test set to identify if the current time step is anomalous, as shown:

$$\hat{Y}_a(n) = \begin{cases} \mathbb{A}, & d(Y(n), \hat{Y}(n)) > d_{th} \\ \mathbb{H}, & d(Y(n), \hat{Y}(n)) \le d_{th} \end{cases}$$

A baseline LSTM-based model that applies the seq2sup trick can be trained and deployed to determine the binary health mode of the incoming time step. Denoted as $LSTM_1$, it can adopt a many-to-one LSTM layer that takes $n_w$=about 30 time steps of $R^{23}$ feature vectors as inputs and outputs a $R^{50}$ hidden vector. A dense layer can be stacked on top of the LSTM layer to map the hidden vector, $R^{50} \rightarrow R^{23}$, to the prediction for this time window. For training, in one non-limiting embodiment, 30,000 time steps of data under healthy mode can be used.

Figure 16:
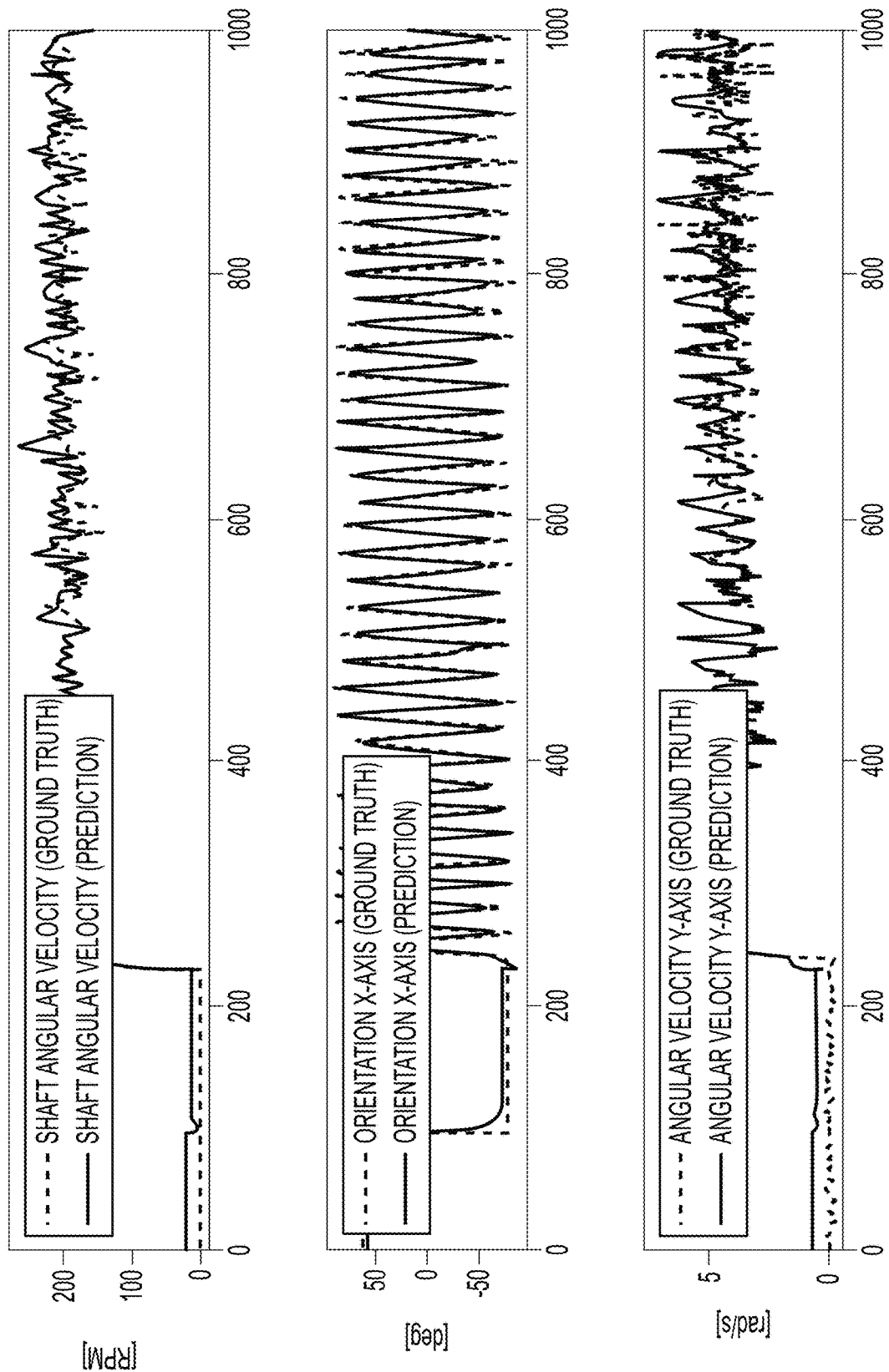
FIG. 16 illustrates a multi-dimensional regression from a long-short-term-memory (LSTM)-based model, showcasing five streams of model outputs against their respective ground truth signals.
Figure 16:
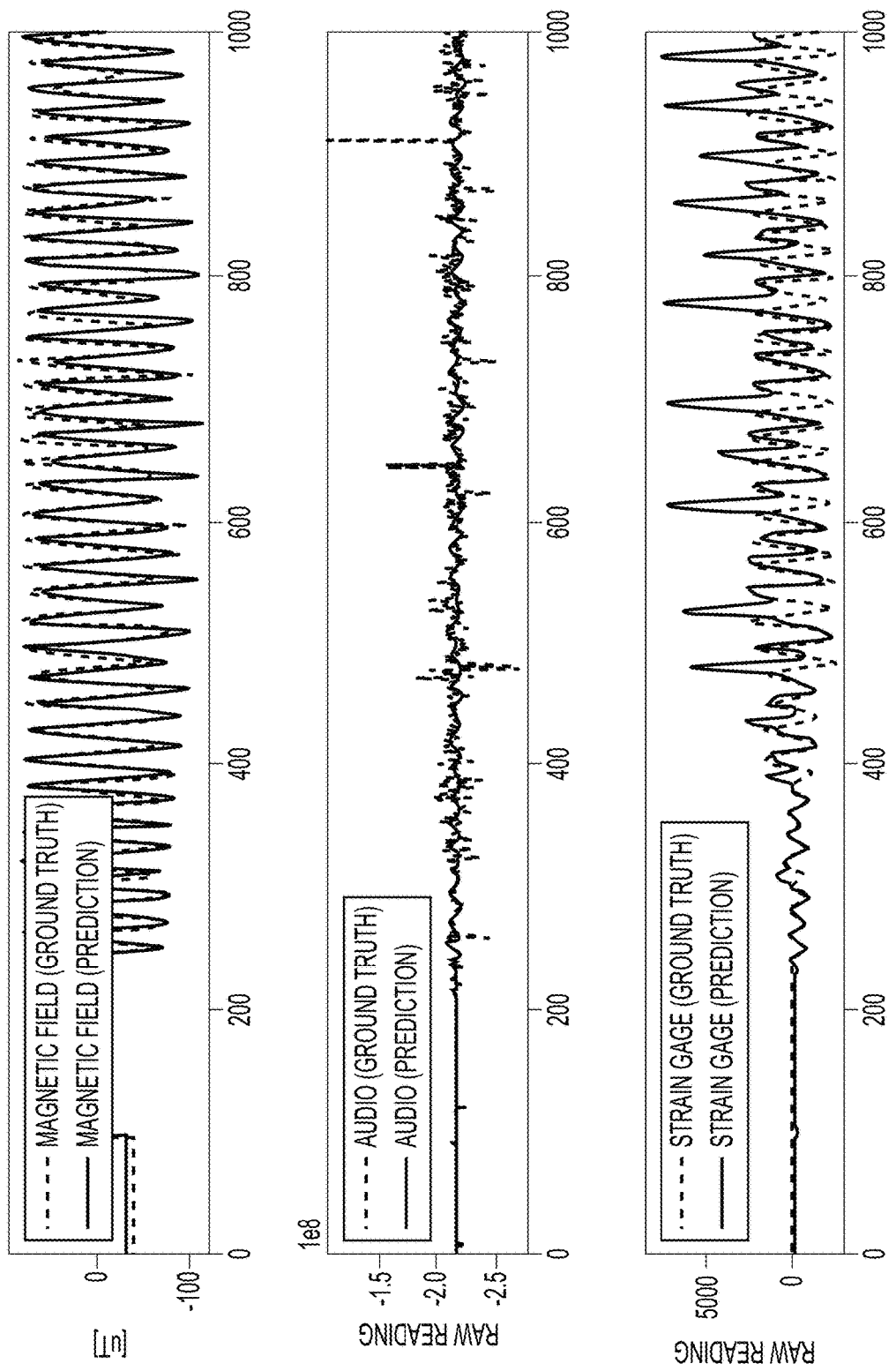
Figure 17:
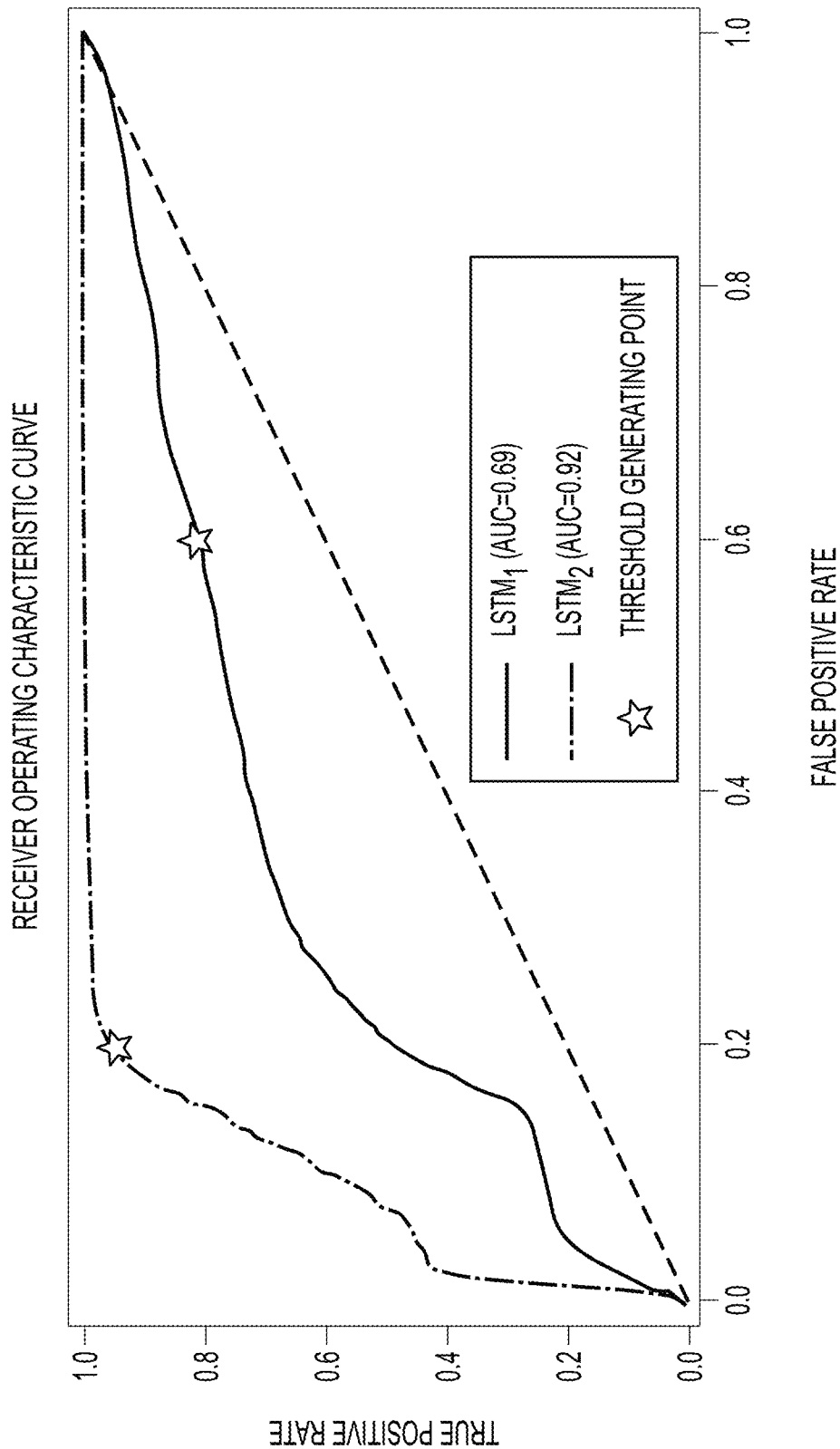
FIG. 17 illustrates a receiver operating characteristic (ROC) curve for the LSTM-based model of FIG. 16, as well as a second LSTM-based model.
Figure 18:
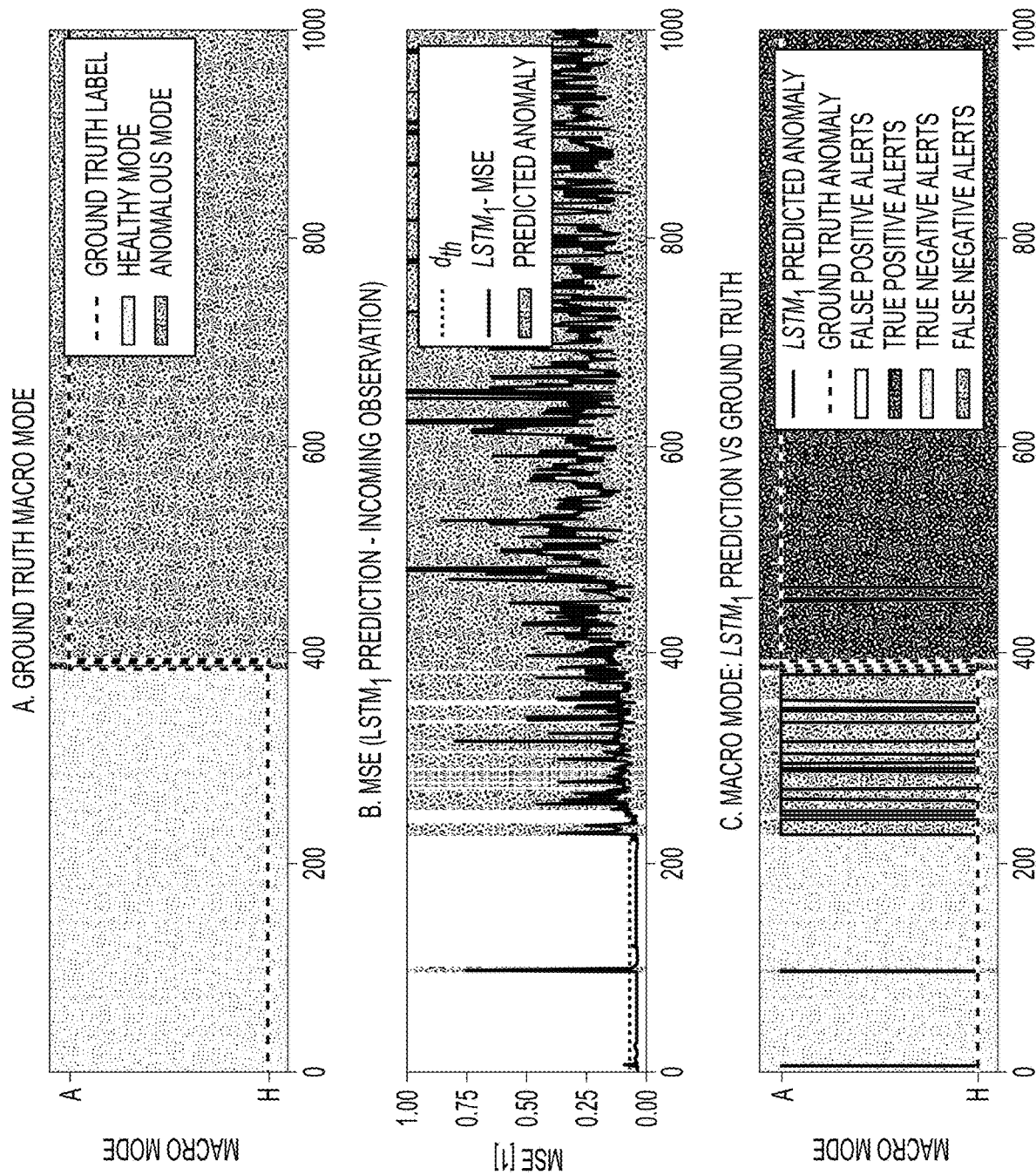
FIG. 18 illustrates binary classification performance from the LSTM-based models of FIG. 17.
Figure 18:
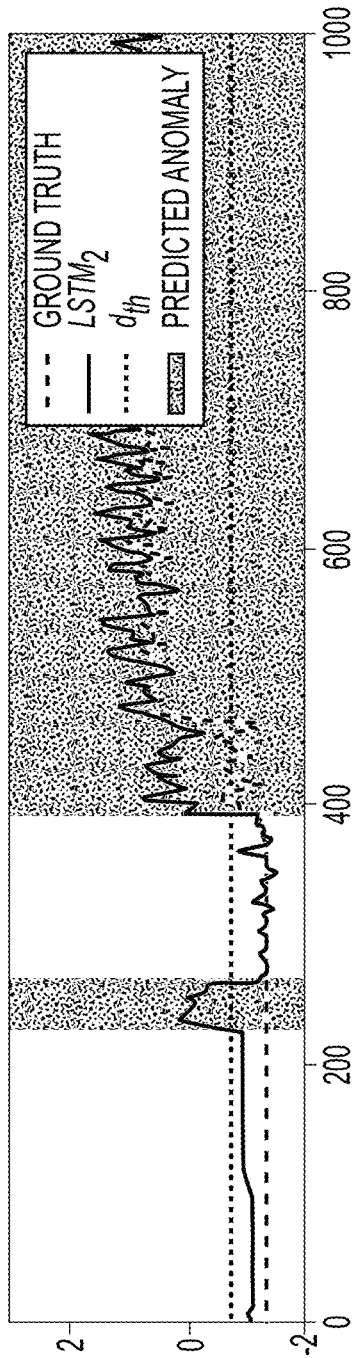
Figure 18:
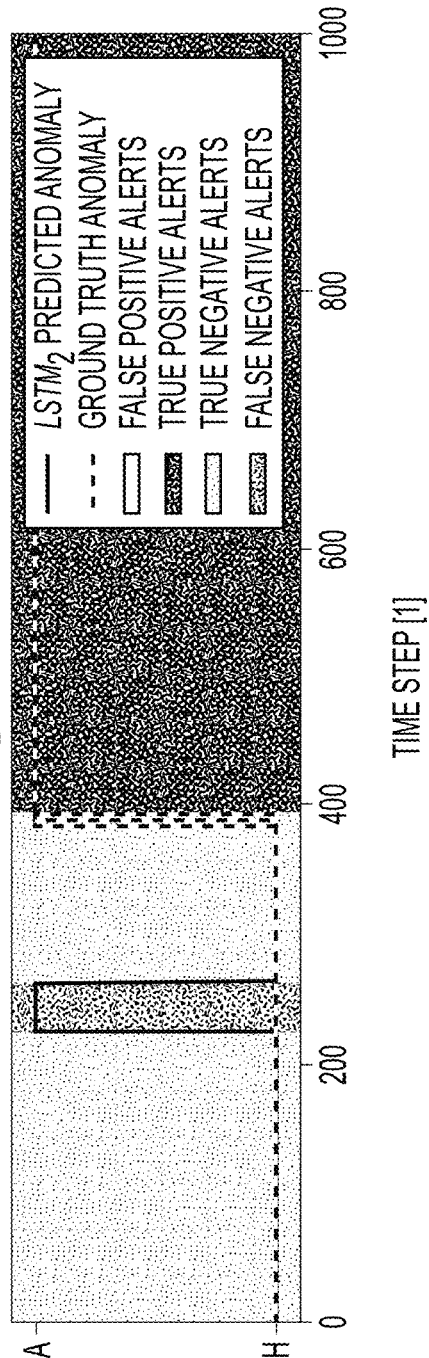

The baseline LSTM model can achieve satisfactory AD&HM results with the proposed dataset. For example, the raw prediction of $LSTM_1$ can be visualized. FIG. 16 showcases five streams of model outputs against their respective ground truth signals. $LSTM_1$ predicts the change in the upcoming signal timely. Especially remarkable are its good prediction of the transition between stationary and rotating plant, and the periodic signals, regarding both frequency and amplitude, as the plant rotates. By way of further example, $LSTM_1$ can be applied for actual anomaly detection. For the data sequence whose macro health mode is shown in graph (A) of FIG. 18, the mean-squared-error (MSE) between $LSTM_1$ output and the incoming signal is shown in graph (B) of FIG. 18. The distance threshold de can be selected based, at least in part, on the receiver operating characteristic (ROC) curve for $LSTM_1$ shown in FIG. 17. According to dt, the predicted anomalous modes can be color-coded and compared with the ground truth in graph (C) of FIG. 18. The model can correctly forecast almost all anomalous macro health modes and more than about 50% of the healthy mode in this data sequence. Considering $LSTM_1$ apply the GPAD archive in an unlabeled fashion, the results demonstrate the significant predictive capacity of the GPAD archive.

The multi-dimensional true anomaly space labels in the GPAD archive allow the training of supervised neural networks. Supervised training is rarely available for time-series AD&HM applications due, at least in part, to the lack of supervised datasets. The GPAD dataset provides three levels of operation condition: the binary labels of macro health mode; the multiclass labels of sub-level health mode; and the numeric attribute given a specific sub-level mode. An LSTM-based model can be trained with the real-time anomaly space label provided by the proposed dataset. This model, denoted as $LSTM_2$, can keep the same architecture as $LSTM_1$, except for the output layer. Instead of outputting an $R^{23}$ vector, $LSTM_2$ outputs a $\hat{Y} \in R^1$ scalar to regress an estimation for the numeric attribute of a dynamic mode anomaly, specifically in the provided study, the end-effector shear load. A threshold can be applied for classification to distinguish if the plant is in a healthy or anomalous mode. In the provided study, data when the plant is under H, V, and N modes can be applied for training.

The supervised nature of the GPAD archive can dramatically increase the effectiveness of the baseline LSTM model. For all testing sequences, the dramatically increased area-under-curve (AUC), being close to unity, in FIG. 17 implies that the $LSTM_2$ significantly out-performs $LSTM_1$. For the specific sequence in graphs (A), and (C) of FIG. 18 demonstrate the $LSTM_2$ prediction against ground truth shear load. The model can correctly forecast shear load increment at the exact time step, n≈400. The model can also accurately predict the anomaly magnitude before and after the transient health mode change. A threshold can be is selected based, at least in part, on the ROC curve to generate a binary prediction on the macro health mode of the plant. Shown in graphs (D) and (E) of FIG. 18, the performance of $LSTM_2$ can be distinctively better than that of $LSTM_1$. Compared to the ground truth, $LSTM_2$ can provide an accurate anomaly alarm, covering almost 100% the anomalous region, and can only trigger approximately 15% false positive alarms. The superior performance of $LSTM_2$ tractably prove the advantage of the anomaly space labels in the proposed dataset.

Coaxial and Orthogonal Dynamic Anomaly Generators

As discussed above, coaxial anomalies can take effect around the rotation axis 15 of the shaft 14. From the mass-spring-damper standpoint, common coaxial anomalies include imbalanced mass, rotational spring, and rotational damping. With the GPASS system 10, imbalance mass can be realized as a type of static anomaly. Plants with rotational damping are common in real-world applications, such as an in injection-molding machines and rotors of ships. In contrast, rotational spring can often be avoided to reduce the risk of deteriorating the spring due to the large radial displacement in a rotating shaft. Consequently, rotational damping is the type of damping primarily implemented during the development of the GPASS system 10.

Fundamental anomalous modes of the orthogonal anomaly generator 50 are also possible. Dynamic anomalies in a rotation plant can be frequently exerted in a direction substantially normal to the rotation axis 15. External normal force can transform into moment load, and can result in deflection and/or torsion of the shaft 14. The data acquisition system 18, via the at least one sensor 64, can be configured to measure attributes of the rotatable shaft 14 caused by at least one of deflection and/or torsion. Two types of normal force can be of fundamental emphasis in the development of the GPASS system 10: (1) large and constant shear load, which routinely occurs as a result of bending deformation; and (2) high-frequency vibratory load, which can be observed in almost any dynamic application. These two modes can be denoted as N-mode and V-mode, respectively. Large normal forces can routinely. occur in vehicle drivetrains, robotic applications, extrusion machines, and so on. Additionally, vibration can be an inevitable topic in any dynamic application. The data acquisition system 18 of the present disclosure can be configured to measure attributes of the rotatable shaft 14 caused by, for example, the vibration load. With the orthogonal anomaly generator 50, other general applications can be implemented, for example by synergizing these two types of fundamental modes.

The orthogonal anomaly generator 50 can have some quantitative and qualitative functional requirements. Quantitatively, the orthogonal anomaly generator 50 may have to suffice considerable ranges for the dynamic inputs. In the N-mode, a key input can be the magnitude of the lateral force. For the V-mode, the active vibration frequency can be a significant dynamic input. The authority of the orthogonal anomaly generator 50 to control these inputs in real-time can be important. Qualitatively, when it is idle, the orthogonal anomaly generator 50 cannot typically interfere with the normal operation of the rotating shaft 14. Sufficiently-high level of modularity to easily extend the scope of anomalous scenarios can be critical for the orthogonal anomaly generator 50. Additionally, it can be preferable for the orthogonal generator 50 to deliver consistent inputs regardless of the objective properties of the shaft, including the materials and the geometries. Still further, protective elements can be integrated into the RAG, for example to avoid hardware damage if any contact between the orthogonal anomaly generator 50 and the rotary shaft may result and/or is necessary.

Mechatronics, functions, and modularity also factor into the present disclosure. Compatibility with multiple anomalous modes is a leading feature of the orthogonal anomaly generator 50. Consequently, modularity can be emphasized during the development stage, with hierarchy encapsulation at different levels of hardware, software, and electronics components.

Figure 9:
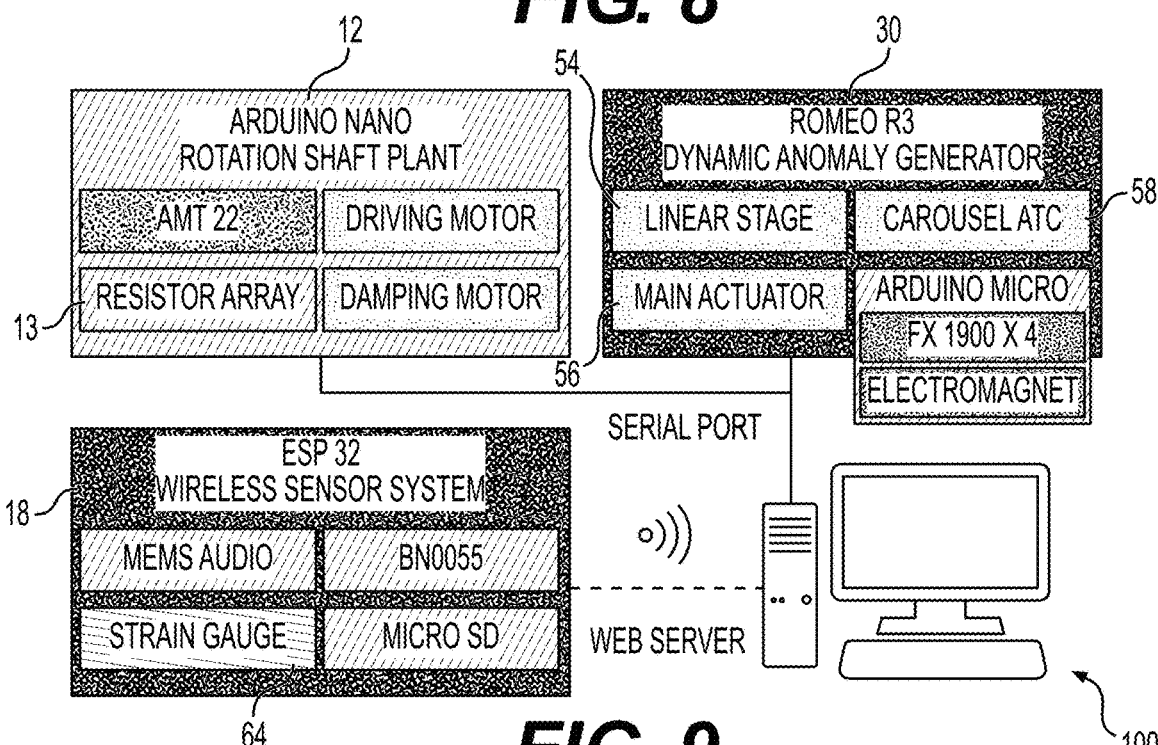
FIG. 9 is a schematic block diagram that illustrates connections and communication within a GPASS system based on the present disclosures including electronic connections of the system.

The electronics connection for the GPASS 10 test bed can adopt a distributed hierarchical architecture for mechatronics encapsulation, as illustrated in FIG. 9. The rotation plant 12 and the dynamic anomaly generator 30 can communicate with a master PC 100, for example via serial ports. The Micro-Controller Unit (MCU) in the dynamic anomaly generator 30 can record inputs of both the damping and driving motors 17, 42, in addition to the angular velocity of the shaft 14. For the dynamic anomaly generator 30, the main MCU can receive commands from a master on the anomalous mode selection and its corresponding attributes, such as reference force trajectory and frequency. All the computations, including the control laws of the linear stage, ATC 58, and the end-effector arms 62, can be encapsulated in the main MCU level, while the sublevel MCU continuously can execute the computed commands and acquire force sensor readings from the end-effector arm 62 as references of anomalies. A person skilled in the art will appreciate other electronic configurations and connections are possible without departing from the spirit of the present disclosure.

The following are engineering constraints when introducing large normal force and active vibration to a rotating shaft 14. The phenomenon directly related to large normal force may be deformation in the shaft 14. The normal force Fn can be equivalently transformed to a moment load via force-moment analysis. Illustrated in FIG. 6, when the shaft 14 is static and homogeneous, the deformation of the shaft 14 under bending moment can be approximated based on the Euler-Bernoulli (EB) beam equation:

$$EI_{zz} \frac{\partial^4 x_d(x_n)}{\partial x_n^4} = M_z(x_n) \quad (2)$$

Under a dynamic condition, rotation exerts distributed centrifugal forces along the shaft 14 and indirectly results in normal and axial deformations with the Poisson's effect. However, the amount of deformation(s) may be trivially different from those in static conditions. When normal force is introduced, the strain on the surface of the shaft 14 is commonly approximated with:

$$M_z = \frac{EI_{zz}}{\rho} \quad (3)$$

$$\epsilon_s = \frac{r_s}{\rho} \quad (4)$$

The surface strain may not saturate the maximum sensing range from on-board strain-gauge sensors of the at least one sensor 64. At the same time, the rated force output from the orthogonal anomaly generator 50 actuator after transmission can satisfy the force requirement:

$$\epsilon_{max,sg} > \epsilon_s; \quad F_\alpha > F_n \quad (5)$$

Introduction of vibration may lead to some constraints in the development and application of the orthogonal anomaly generator-frequency. There are at least a few frequencies to be considered: angular velocity of the shaft 14; vibration frequency actively introduced by the orthogonal anomaly generator 50 to excite the shaft 14; data acquisition frequency of the sensor system 18; natural frequencies of the shaft 14; first natural frequency, or mechanical bandwidth of the orthogonal anomaly generator 50; and resonance frequencies of the interaction between the orthogonal anomaly generator 50 and the shaft 14. Among them, $\omega_s$ is an objective property of the shaft and its boundary conditions and can be approximated via finite element analysis or with the EB beam model. For example, the natural frequency for a static shaft 14 that is simply supported in both ends can be approximated as:

$$\omega_s = (k\pi)^2 \sqrt{\frac{EI_{zz}}{m_s l_s^4}} \quad (6)$$

where k=1, 2, 3 denotes the first, second and third mode of natural frequencies. Under rotation, the first three modes of natural frequencies of are close to those under static condition. The hardware frequencies of the orthogonal anomaly generator 50, including $\omega_o$ and $\omega_{ir}$, are discussed in further detail below. The active frequencies, $\omega_r$ and $\omega_a$, can be directly commanded by the operator during synthesis as inputs. An anomalous rotating shaft 14 normally shows significant vibrational frequency components at k$\omega_r$. In principal, the active frequencies, and their multiples, should not typically coincide with the mechanical frequencies to avoid accidental excitation. Accounting for this scalar factor and leaving a safety boundary, the GPASS may be programmed such that:

$$3\omega_r, \omega_\alpha < 0.9 \min(\omega_{ir}, \omega_o, \omega_s) \quad (7)$$

Further, to prevent aliasing, another set of constraints can be imposed on the active frequencies:

$$\max(3\omega_r, \omega_\alpha) < 0.5\omega_{\omega ss} \quad (8)$$

To introduce the two fundamental anomalous modes, large normal force and active vibration, to the rotating shaft 14, both contact and contactless methodologies can be used, i.e., $N_{ct-}$, $V_{ct-}$, $N_{cs-}$, and $V_{cs-}$ modes. The interaction between the end-effector arm 62 and the remote end-effector coupler 80 can be modelled with a mass-spring model, like the one illustrated in FIG. 7. The transfer function from the actuator input can be:

$$\frac{X_d}{X_a}(s) = \frac{k_t k_e}{(m_e s^2 + k_e)(m_s s^2 + (k_t + k_s))} \quad (9)$$

$$\frac{F_n}{X_a}(s) = \frac{k_t k_e (m_s s^2 + k_t)}{(m_e s^2 + k_e)(m_s s^2 + (k_t + k_s))} \quad (10)$$

For the contact method, an assumption that $k_{t,ct} >> k_e \approx k_{sus}$ can be made, accounting for rigid body contact and the relatively lower stiffness of the mini suspension 70. The dominating pole can thus be approximated as:

$$\omega_0 \approx \pm \sqrt{\frac{k_{sus}}{m_e}} \quad (11)$$

and can be taken into account for equation (8). The contactless method can be implemented in a similar way with minor changes:

$$k_{t,cs} \approx f(B_{cs}(t), x_e; x_d, P) \quad (12)$$

$$B_{cs}(\omega_\alpha, t) = B_{em} \cdot \mathbb{1}(\omega_\alpha, t) \quad (13)$$

Alternatively, the contactless method can be implemented in the following similar manner:

$$F_{n,cls}(t|\omega_\alpha) \approx f(B_{cls}(t|\omega_\alpha), x_e, x_d, P) \quad (12a)$$

$$B_{cls}(t|\omega_\alpha) = B_{em} \cdot \mathbb{1}(t|\omega_\alpha) \quad (13a)$$

in which the electromagnet can be commanded to switch High/Low at a certain frequency.

The exact model in equations (12) and 12 (a) are helpful. The main caveat for the contactless method is that unless the electromagnet is especially strong, i.e., large $B_{em}$ and consequently large $k_{t,cs}$, the tool can easily collide into the remote end-effector coupler 80 and the contactless method is no longer valid.

Figure 8:
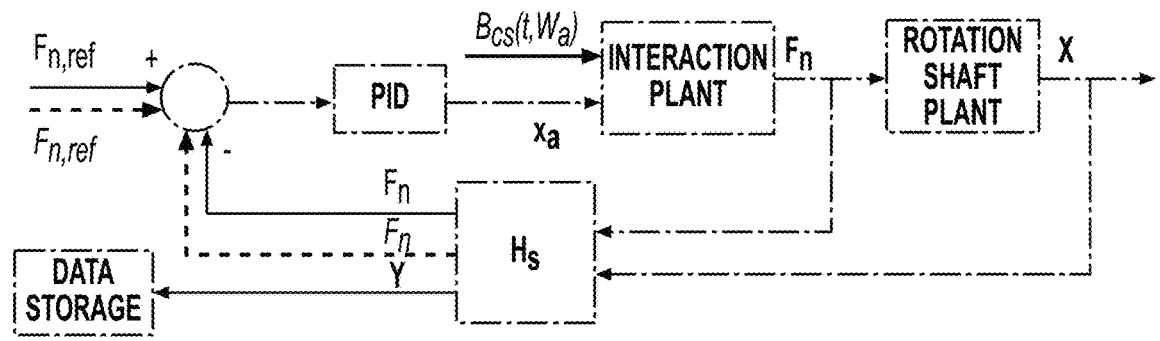
FIG. 8 is a schematic block diagram for various anomaly generation modes of a GPASS system based on the present disclosures, including $N_{ct}$_mode; $V_{ct}$_mode; $N_{cs}$_mode, $V_{cs}$_mode, and shared control flow mode.

The block diagram in FIG. 8 illustrates the force referenced-position-control law used in this example implementation. The force control for both contact and contactless V- and N-modes may be carried out with a proportional-integral-derivative (PID) controller, to stabilize the dynamic system in equation (10). $V_{cs}$_mode is implemented in a unique method. Because @$_a$ can be a significant factor vibration, the end-effector MCU can directly take the reference frequency as an attribute and output Bes accordingly. Under most circumstances when the vibration amplitude is not of utmost importance, the feedback controller may be specified idle. When the amplitude of the vibration force is defined, the controller may carry out an additional calibration step with the feedback control loop, similar to conducting a Nes procedure, before synthesizing vibration. This unique method provided for herein can then be used because the control of Bes is encapsulated in the electronics and software domains, whereas Vat is more dependent on mechanical components and the main actuator. Thus, the $V_{cs}$_mode can achieve a much higher $\omega_a$ than the $V_{ct}$_mode. Additionally, stiffer suspensions for $V_{cs}$_mode can be used, for example to increase the bandwidth.

An example implementation of the GPASS 10 was produced according to the disclosed embodiments. Fused deposition modelling may be used for bulky customized parts, and digital laser printing may be applied for precision components, among other fabrication techniques. Standard stocks may be used for load-bearing components. In the following, the on-board electronic components in FIG. 9 are listed and the frequency variables discussed in the previous sections are:

max($\omega_r$)=3485 RPM=580 Hz; $\omega_o$=2 kHz max($\omega_a$)=160 MHz; $\omega_{wss}$=87 Hz(CITE); $p$=28

Moreover, a prototype of the GPASS system has been instrumented according to the present disclosure. As demonstrated in FIG. 7, an AAG motor and a driving motor can be 12 VDC with 4 5W rated power and a maximum speed of max ($\omega_r$)=3485 RPM=580 Hz. The current ATC can load i=4 slider arms at the same time. The active vibration, for this prototype, can be capped, for example, at a maximum frequency of max ($\omega_\alpha$)=16 0M Hz.

A method of measuring anomalous scenarios is described herein. The method includes a first operation of rotating a rotatable shaft about a rotation axis. The method further includes a second operation of generating at least one of (i) at least one coaxial anomaly that takes effect around the rotation axis of the rotatable shaft while the rotatable shaft is rotating via a dynamic anomaly generator operably connected to the rotatable shaft, or (ii) at least one orthogonal anomaly that is exerted in a direction substantially perpendicular to the rotation axis of the rotatable shaft while the rotatable shaft is rotating via the dynamic anomaly generator.

The method further includes a third operation of generating at least one dynamic label for each anomaly of the at least one coaxial anomaly and the at least one orthogonal anomaly while the rotatable shaft is rotating. The at least one dynamic label for each anomaly includes at least one descriptor corresponding to the anomaly that describes the anomaly such that a machine learning method may utilize the at least one descriptor for machine learning.

A GPASS thus can provide several benefits and advantages, including one or more of the following either individually or in combination:
1. is an active anomaly synthesizer, that can generate dynamic (coaxial+orthogonal) and static anomalies.
2. Generates multi-modes of anomaly (simultaneously) and acquires multi-variate physical readings.
3. Lowers the risk and cost of anomaly generation.
4. Generates clean/isolated/decoupled anomalous data.
5. Monitors and records data at different time scales.
6. Is a modular and highly customizable layout.
7. Provides good, supervised data for machine learning on anomaly diagnose/prognosis.

It should be understood that the subject matter defined in the appended claims is not necessarily limited to the specific implementations described above. The specific implementations described above are disclosed as examples only.

The invention claimed is:

1. An anomalous scenario synthesizer apparatus, comprising:
   a rotatable shaft configured to be rotationally driven about a rotation axis;
   a data acquisition system operably associated with the rotatable shaft and configured to measure attributes of the rotatable shaft; and
   a dynamic anomaly generator operably connected to the rotatable shaft, the dynamic anomaly generator configured to generate at least one anomaly in the rotatable shaft while the rotatable shaft is rotating, and configured to generate a general-purpose anomaly in a physical domain dataset that includes at least one dynamic label for each anomaly of the at least one anomaly that is automatically generated and included in the dataset in real-time while the rotatable shaft is rotating and while the anomaly is occurring,
   wherein the at least one dynamic label for each anomaly is a ground truth data label based on known values of signals collected from the dynamic anomaly generator that are known to be indicative of a type of force exerted on the rotatable shaft, and wherein the dynamic label for each anomaly includes at least one descriptor corresponding to the anomaly that describes the type of force exerted on the rotatable shaft in an anomaly generation mode generated by the dynamic anomaly generator such that a machine learning method may utilize the at least one descriptor as ground truth data for training the machine learning method.

2. The anomalous scenario synthesizer apparatus of claim 1, wherein the dynamic anomaly generator comprises a coaxial anomaly assembly operably coupled to the rotatable shaft and configured to generate at least one anomaly that is a coaxial anomaly that takes effect around the rotation axis of the rotatable shaft while the rotatable shaft is rotating.

3. The anomalous scenario synthesizer apparatus of claim 2,
   wherein the rotational shaft is rotational driven by a first motor operably connected to a first terminal end of the rotational shaft, and
   wherein the coaxial anomaly assembly includes a second motor operably connected to a second terminal end of the rotational shaft opposite the first terminal end, the second motor configured to generate the at least one anomaly that is a coaxial anomaly.

4. The anomalous scenario synthesizer apparatus of claim 1 wherein the dynamic anomaly generator comprises an orthogonal anomaly assembly operably coupled to the rotatable shaft and configured to generate at least one anomaly that is an orthogonal anomaly exerted in a first direction substantially perpendicular to the rotation axis of the rotatable shaft.

5. The anomalous scenario synthesizer apparatus of claim 4,
   wherein the orthogonal anomaly assembly is further configured to generate a constant load on the rotation shaft in the first direction substantially perpendicular the rotation axis of the rotatable shaft to cause at least one of deflection or torsion of the rotatable shaft, and
   wherein the data acquisition system is configured to measure attributes of the rotatable shaft caused by the at least one of deflection or torsion.

6. The anomalous scenario synthesizer apparatus of claim 4,
   wherein the orthogonal anomaly assembly is further configured to generate a vibration load on the rotatable shaft to cause vibration of the rotate shaft, and wherein the data acquisition system is configured to measure attributes of the rotatable shaft caused by the vibration load.

7. The anomalous scenario synthesizer apparatus of any of claim 1, wherein the dynamic anomaly generator is further configured to generate at least one time step associated with each anomaly of the at least one anomaly, and wherein the at least one dynamic label for each anomaly is generated for each time step of the at least one time step.

8. The anomalous scenario synthesizer apparatus of claim 7, wherein to provide accurate real-time labeling of a ground truth health condition, for each time step, the dynamic anomaly generator is configured to format the dynamic label as:

$Y_a(n)$ [0]: Macro Health Mode $K \in S: =\{H, A\}$;

$Y_a(n)$ [1]: Sub-level Mode $k \in s: =\{H, D, \{N_e\}, \{V_e\}\}$; and $Y_a(n)$ [2]: Numeric Attribute $y_k \in Y_k$; $k \in s$, wherein H is a healthy mode of the rotatable shaft,
wherein A is an anomalous mode of the rotatable shaft,
wherein D is a D-mode type of force exerted on the rotatable shaft that includes a coaxial damping coefficient,
wherein $N_e$ is an N-mode type of force exerted on the rotatable shaft that includes an end-effector force,
wherein $V_e$ is a V-mode type of force exerted on the rotatable shaft that includes an active vibration frequency,
wherein $y_k$ includes at least one discrete numerical value representative of a force exerted on the rotatable shaft and $Y_k$ includes an attribute space of possible values of the at least one discrete numerical values, and
wherein K is an element of a set of S and k is an element of a set of s.

9. The anomalous scenario synthesizer apparatus of claim 1, wherein the data acquisition system comprises at least one sensor configured to measure attributes of the rotatable shaft in response to the dynamic anomaly generator generating the at least one anomaly.

10. The anomalous scenario synthesizer apparatus of claim 1, wherein the attributes of the rotatable shaft measured by the data acquisition system include at least one of coaxial damping coefficient, end-effector force, or active vibration frequency.

11. The anomalous scenario synthesizer apparatus of claim 1, wherein the dynamic anomaly generator further comprises:
a coaxial anomaly assembly configured to be operably coupled to a rotatable shaft and configured to generate at least one coaxial anomaly that takes effect around a rotation axis of the rotatable shaft to which the coaxial anomaly assembly is operably coupled while the rotatable shaft is rotating;
an orthogonal anomaly assembly configured to be operably coupled to the rotatable shaft to which the coaxial anomaly assembly is operably coupled and configured to generate at least one orthogonal anomaly exerted in a first direction substantially perpendicular to the rotation axis of the rotatable shaft; and
a controller configured to generate at least one dynamic label for each coaxial anomaly of the at least one coaxial anomaly and at least one dynamic label for each orthogonal anomaly of the at least one orthogonal anomaly while the rotatable shaft is rotating,
wherein the at least one dynamic label for each coaxial anomaly and the at least one dynamic label for each orthogonal anomaly comprises at least one descriptor corresponding to the anomaly that describes the anomaly such that a machine learning method may utilize the at least one descriptor for machine learning.

12. The anomalous scenario synthesizer apparatus of claim 11, wherein the rotatable shaft is configured to be rotationally driven about the rotation axis, and wherein a data acquisition system is operably associated with the rotatable shaft and configured to measure attributes of the rotatable shaft in response to the dynamic anomaly generator generating at least one of the at least one coaxial anomaly or the at least one orthogonal anomaly.

13. The anomalous scenario synthesizer apparatus of claim 11,
wherein the controller is further configured to generate at least one time step associated with each anomaly of the at least one coaxial anomaly and the at least one orthogonal anomaly, and
wherein the at least one dynamic label for each anomaly is generated for each time step of the at least one time step.

14. The anomalous scenario synthesizer apparatus of claim 11, wherein the attributes of the rotatable shaft measured by the data acquisition system include at least one of coaxial damping coefficient, end-effector force, or active vibration frequency.

15. A method of measuring anomalous scenarios, comprising:
rotating a rotatable shaft about a rotation axis;
generating at least one of:
(i) at least one coaxial anomaly that takes effect around the rotation axis of the rotatable shaft while the rotatable shaft is rotating via a dynamic anomaly generator operably connected to the rotatable shaft; or
(ii) at least one orthogonal anomaly that is exerted in a direction substantially perpendicular to the rotation axis of the rotatable shaft while the rotatable shaft is rotating via the dynamic anomaly generator; and
generating, via the dynamic anomaly generator, a general-purpose anomaly in a physical domain dataset that includes at least one dynamic label for each anomaly of the at least one coaxial anomaly and the at least one orthogonal anomaly that is automatically generated and included in the dataset in real-time while the rotatable shaft is rotating and while the at least one coaxial anomaly and the at least one orthogonal anomaly are occurring,
wherein the at least one dynamic label for each anomaly is a ground truth data label based on known values of signals collected from the dynamic anomaly generator that are known to be indicative of a type of force exerted on the rotatable shaft, and wherein the dynamic label for each anomaly includes at least one descriptor corresponding to the anomaly that describes the type of force exerted on the rotatable shaft in an anomaly generation mode generated by the dynamic anomaly generator such that a machine learning method may utilize the at least one descriptor as ground truth data training the machine learning method.

16. The method of claim 15, further comprising generating both of:
(i) the at least one coaxial anomaly that takes effect around the rotation axis of the rotatable shaft while the rotatable shaft is rotating via a dynamic anomaly generator operably connected to the rotatable shaft; and (ii) the at least one orthogonal anomaly that is exerted in a direction substantially perpendicular to the rotation axis of the rotatable shaft while the rotatable shaft is rotating via the dynamic anomaly generator.

17. The method of claim 15, further comprising:
measuring at least one attribute of the rotatable shaft based on at least one of the at least one coaxial anomaly or the at least one orthogonal anomaly generated.

18. The method of claim 15, wherein generating the at least one orthogonal anomaly further comprises:
generating a constant load on the rotatable shaft in the direction substantially perpendicular to the rotation axis of the rotatable shaft to cause at least one of deflection or torsion of the rotatable shaft.

19. The method of claim 18, further comprising:
measuring at least one attribute of the rotatable shaft based on at least one of deflection of the rotatable shaft, torsion of the rotatable shaft or vibration of the rotatable shaft.

20. The method of claim 15, wherein generating the at least one orthogonal anomaly further comprises:
generating a vibration load on the rotatable shaft to cause vibration of the rotatable shaft.

\* \* \* \* \*